US009354697B2

(12) United States Patent
Huang et al.

(10) Patent No.: US 9,354,697 B2
(45) Date of Patent: May 31, 2016

(54) DETECTING ACTIVE REGION IN COLLABORATIVE COMPUTING SESSIONS USING VOICE INFORMATION

(71) Applicant: Cisco Technology, Inc., San Jose, CA (US)

(72) Inventors: Haihua Huang, Jiangsu (CN); Kejun Xia, Jiangsu (CN); Yaqing Zhang, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 14/098,723

(22) Filed: Dec. 6, 2013

(65) Prior Publication Data

US 2015/0163259 A1 Jun. 11, 2015

(51) Int. Cl.
*G06F 15/16* (2006.01)
*G06F 3/00* (2006.01)
*H04N 21/00* (2011.01)
*H04L 29/06* (2006.01)
*H04N 21/439* (2011.01)
*H04N 21/44* (2011.01)
*H04N 21/4402* (2011.01)
*H04N 21/443* (2011.01)
*H04N 21/4788* (2011.01)

(52) U.S. Cl.
CPC .............. *G06F 3/00* (2013.01); *H04L 65/4038* (2013.01); *H04N 21/00* (2013.01); *H04N 21/4394* (2013.01); *H04N 21/44008* (2013.01); *H04N 21/4438* (2013.01); *H04N 21/440236* (2013.01); *H04N 21/4788* (2013.01)

(58) Field of Classification Search
CPC .... H04L 65/403; H04L 65/4038; H04N 7/15; H04N 21/00; H04N 21/4394; H04N 21/4408; H04N 21/4788
USPC ........................... 709/203, 204, 205; 715/759
See application file for complete search history.

(56) References Cited

U.S. PATENT DOCUMENTS

| 2010/0131868 | A1* | 5/2010 | Chawla | G06F 3/044 715/759 |
| 2010/0262925 | A1* | 10/2010 | Liu | G06Q 10/10 715/759 |
| 2013/0141517 | A1* | 6/2013 | Shen | H04N 7/15 348/14.03 |
| 2015/0142884 | A1* | 5/2015 | Veramendi | H04L 12/1813 709/204 |

* cited by examiner

*Primary Examiner* — Frantz Jean
(74) *Attorney, Agent, or Firm* — Patterson + Sheridan, LLP

(57) ABSTRACT

In an example embodiment disclosed herein, there is described methods and a system for sharing of content in collaborative computing sessions. The methods and the system are operable to maintain a collaborative computing session between a plurality of participant devices, wherein at least one participant device operates as a presenter device to share data with at least one other participant viewer device. The methods and system are further operable to designate data to be shared with at least one viewer device and to identify at least one active region contained within the shared data. The methods and system are also operable to transmit the designated shared data to the at least one viewer device, render the shared data for display on at least one viewer device to maximize the display of the at least one active region, and display the rendered shared data on the at least one viewer device.

20 Claims, 14 Drawing Sheets

//DETECTING ACTIVE REGION IN COLLABORATIVE COMPUTING SESSIONS USING VOICE INFORMATION

TECHNICAL FIELD

The present disclosure relates generally to computer networks, and more particularly, to sharing of content in collaborative computing sessions.

BACKGROUND

Collaborative computing sessions, such as interactive conferences (e.g., conferences or meetings), may be supported by a network of servers and client computers. In particular, one feature available to online meetings or data conferencing systems is to allow computer users at different locations to communicate via a computer network and share applications stored and/or executed on one of the user's computers, such as through a software program that enables the users to share applications (e.g., sharing a presenter's application with one or more attendees/viewers). The collaborative computing sessions typically include an audio component in addition to the shared visual content, allowing the attendees to interact or discuss with each other, the shared content.

A conferencing technique for sharing applications during a data conference is to share a predefined area of the presenter's computer screen with an attendee (e.g., "desktop sharing"). Using this technique, the presenter's computer captures an image within a predefined portion of the presenter's computer screen/display (e.g., the entire screen or a portion of the screen). The captured image within the predefined portion of the presenter's computer is then transmitted to the attendee's computer for viewing. A refinement to this conventional technique allows the presenter to selectively share an application with the attendee (e.g., "application sharing"). In some situations, an attendee may be using a mobile device to participate in the session and to access the shared content.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
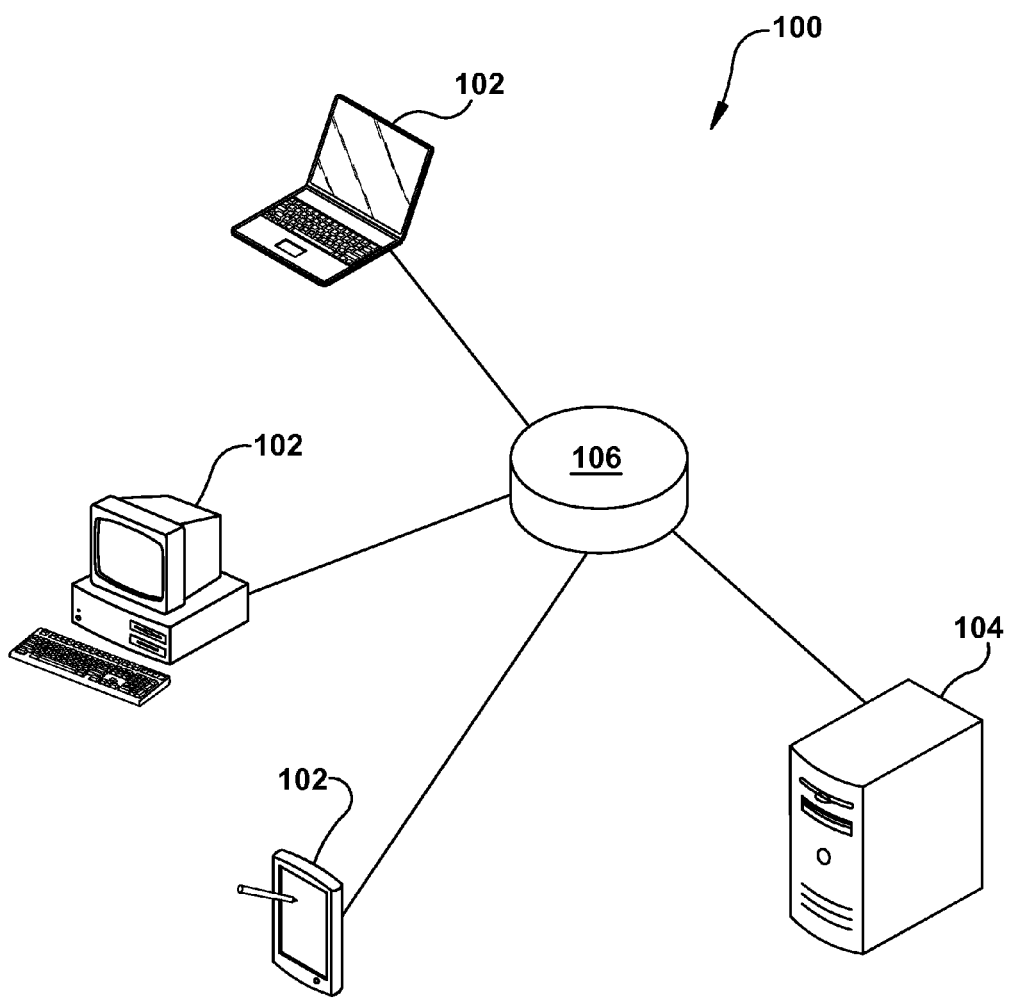
FIG. 1 is a block diagram illustrating an example computer network for collaborative computing sessions.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment described herein, there is disclosed a method, apparatus, and logic for sharing content in collaborative computing sessions. A collaborative computing session is maintained between a plurality of participant devices in data communication with each other, wherein at least one participant device operates as a presenter device to share data associated with the group consisting of at least one application program executing on the presenter device, a predefined area of a display of the presenter device, and combinations thereof, with at least one other participant viewer device. At least one of the participant devices is operable to generate an audio stream. Data associated with the group consisting of at least one application program executing on the presenter device, a predefined area of the display of the presenter device, and combinations thereof, is designated as shared data, of which at least a portion, is to be shared with at least one viewer device during the collaborative computing session. At least one active region is identified within the shared data, wherein the active region is determined as a function of content of any associated audio streams generated by one or more of the presenter device or at least one viewer device in correlation with content of the shared data, and the designated shared data is transmitted to the at least one viewer device. The shared data is rendered for display on at least one viewer device, such that the shared data will be displayed to maximize the display of the at least one active region; and the rendered shared data is displayed on the at least one viewer device.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a schematic diagram illustrating an example computer architecture 100 in which the methods and apparatuses for sharing content in collaborative computing sessions are displayed. The example architecture includes a plurality of participant devices 102, a server 104, and a network 106 connecting participant devices 102 to server 104 and participant devices 102 to other participant devices as required. Participant devices, as described below, may be any personal computing device known in the art including, for example and without limitation, a laptop computer, a personal computer, a personal data assistant, a web-enabled cellular telephone, a smart phone, a proprietary network device, or other web-enabled electronic device. Communication between the participant devices 102 and the server 104 within the network 106 is suitably made possible with the use of communication protocols, which govern how computers exchange data over a network, as is known in the art. Those skilled in the art will understand that any number of devices, servers, links, etc. may be used in the computer network, and that the view shown herein is for simplicity.

In this environment, a number of participants may interact in an online, interactive, or collaborative setting. Such a setting can be for a meeting, training or education, or support, or any other event that may require a number of participants to work together, interact, collaborate, or otherwise participate, such as web conferences, online meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 102 through server 104 and the network 106. Those skilled in the art will understand that the session may be implemented or established using protocols and services as is known in the art. Conversely, a "meeting" describes a personal layer of communication overlaid upon the session where participants/users communicate with each other. Moreover, while the terms "session" and "meeting" may generally be used interchangeably herein to denote a collaboration of users or devices, particular instances of their use may denote a particular distinction (e.g., a session may start with attendees joining/connecting to the server, while a meeting may not start until a host/presenter joins the session), as may be understood by those skilled in the art.

In other words, a collaboration session comprises a plurality of devices or "participant devices," of which "attendee devices" are configured to view/receive content, such as video, audio, and textual, submitted or "shared" by "presenter devices." In some instances, the attendee devices are capable of modifying the content shared by the presenter device.

In particular, each participant (e.g., hosts/presenters and/or attendees) may operate a participant device 102. Each participant device 102 may comprise an electronic device with capability for visual and/or auditory presentation. Thus, a participant device 102 can be, for example, a laptop computer, a personal computer, a personal data assistant, a web-enabled cellular telephone, a smart phone, a proprietary network device, or other web-enabled electronic device. Each participant device 102 supports communication by a respective participant, in the form of suitable input device (e.g., keyboard, mouse, stylus, keypad, etc.) and output device (e.g., monitor, display, speech, voice, or other device supporting the presentation of audible/visual information).

The meeting (collaborative computing session) of the various participants may be supported by a server 104 which may be maintained or operated by one or more of the participants and/or a third-party service provider. The server 104 may be a computer system that is connected to network 106, and which may comprise and appear as one or more server computers thereon. Server 104 may store information (e.g., content) and application modules which can be provided to the participant devices 102. In some embodiments, these application modules are downloadable to the participant devices 102 and may support various functions that may be required for an interactive meeting or collaborative effort among the participants. The participant devices 102 and the server 104 may interact in a client/server architecture, which may provide high performance and security for a multi-participant collaborative environment.

Figure 2:
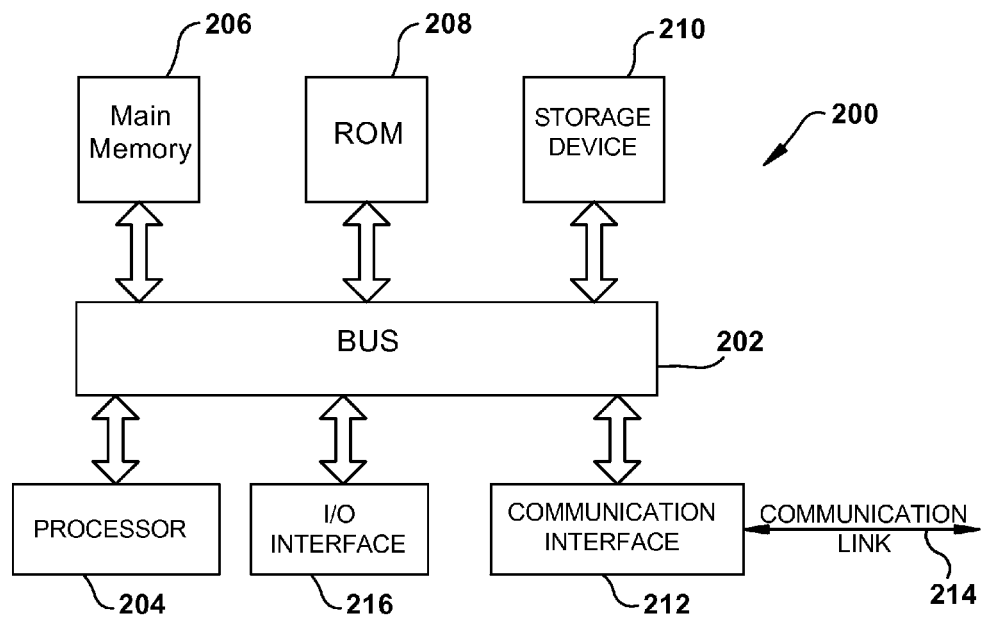
FIG. 2 is a block diagram illustrating an example participant device for collaborative computing sessions.

FIG. 2 illustrates a schematic block diagram of an example participant device 200 that may be advantageously used with one or more embodiments described herein, e.g., for collaborative computing. Illustratively, participant device 200 may be implemented or incorporated in any suitable computer such as, for example, a laptop computer, a personal computer, a personal data assistant, a web-enabled cellular telephone, a smart phone, a proprietary network device, or other web-enabled electronic device.

In particular, the participant device 200 comprises a bus 202 or other communication mechanism for communicating information and a processor 204 coupled with the bus for processing information. The participant device 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. The participant device 200 further includes a read only memory (ROM) 208 or other static storage device coupled to bus 202 for storing static information and instructions for processor 204. The participant device 200 may further comprise a storage device 210, such as a magnetic disk, optical disk, and/or flash storage, which is provided and coupled to bus 202 for storing information and instructions.

The processor 204, in connection with the memory 206, is configured to implement the functionality described herein with reference to the participant device. The memory 206 stores software programs or other executable program instructions associated with the embodiments described herein. Such instructions may be read into memory 206 from another computer-readable medium, such as storage device 210.

The processor 204 comprises the necessary elements or logic adapted to execute the software programs to generally perform functions relating to collaborative computing sessions, as described herein. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software. For instance, the processor may, but is not limited to, manage or perform session-related activities (e.g., starting a session, ending a session, setting privileges in a session, accounting, etc.); participant-related activities (e.g., designating a host, establishing participant privileges, assigning a participant presenter privileges, etc.); content sharing-related activities (e.g., designating content to be shared, determining content sharing parameters, implementing sharing of content, displaying shared content, etc.); communication activities (e.g., handling communication between device and the network as well as with other devices, transmittal/receipt of shared content, etc.); and the like.

The term "computer-readable medium" as used herein refers to any medium that participates in providing instructions to processor 204 for execution. Such a medium may take many forms, including but not limited to non-volatile media, and volatile media. Non-volatile media include, for example, optical or magnetic disks, such as storage device 210. Volatile media include dynamic memory such as main memory 206. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

The participant device 200 also includes a communication interface 212 coupled to bus 202. Communication interface 212 provides a two-way data communication coupling participant device 200 to communication link 214. Communication link 214 typically provides data communication to other networks or devices. For example, communication interface 212 may be a local area network (LAN) card to provide a data communication connection to a compatible LAN. As another example, communication interface 212 may be an integrated services digital network (ISDN) card or a modem to provide a data communication connection to a corresponding type of telephone line. Wireless links may also be implemented. In any such implementation, communication interface 212 sends and receives electrical, electromagnetic, or optical signals that carry digital data streams representing various types of information. Although the illustrated example has one communication interface 212 and one communication link 214, those skilled in the art should readily appreciate that this is for ease of illustration, as the example embodiments described herein may have any physically realizable number of communication interfaces 212, and/or communication links 214.

The participant device 200 also includes at least one input/output interface 216 connected to the bus 202 and in data communication with one or more user interface devices, such as a mouse, keyboard, monitor/screen, audio equipment, video equipment, etc. (not explicitly shown).

Figure 3:
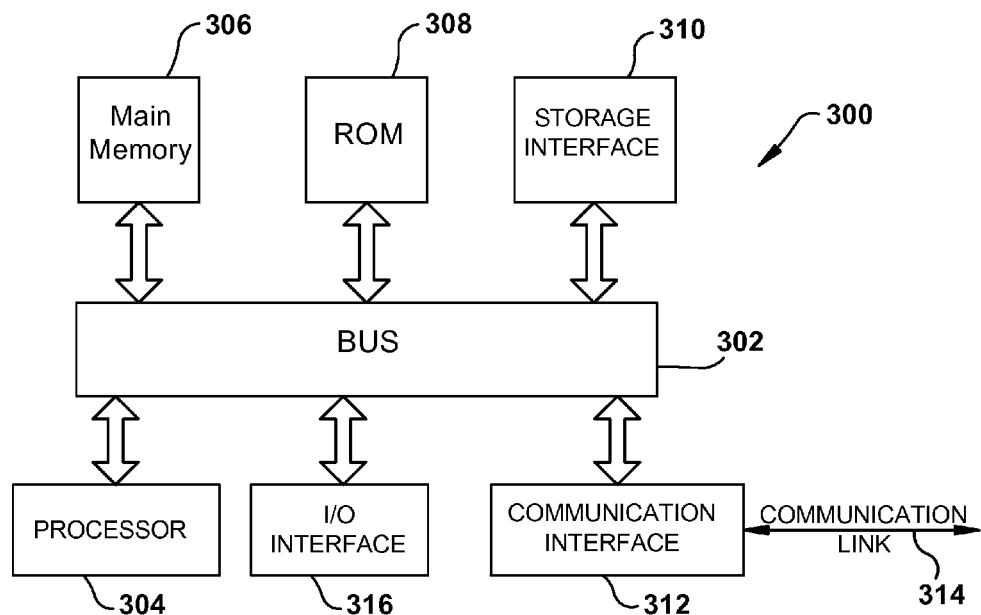
FIG. 3 is a block diagram illustrating an example server for collaborative computing sessions.

FIG. 3 illustrates an example implementation for a server 300 according to one or more embodiments described herein. The server 300 comprises a bus 302 or other communication mechanism for communicating information and a processor 304 coupled with the bus for processing information. The server 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. The server 300 further includes a read only memory (ROM) 308 or other static storage device coupled to bus 302 for storing static information and instructions for processor 304. The server may further comprise a storage device 310, such as a magnetic disk, optical disk, and/or flash storage, which is provided and coupled to bus 302 for storing information and instructions.

The processor 304, in connection with the main memory 306, is configured to implement the functionality described herein with reference to the participant device. The main memory 306 stores software programs or other executable program instructions associated with the embodiments described herein. Such instructions may be read into main memory 306 from another computer-readable medium, such as storage device 310.

The processor 304 comprises the necessary elements or logic adapted to execute the software programs to generally perform functions relating to collaborative computing sessions, as described herein. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software. For instance, the controller may, but is not limited to, manage or perform session-related activities (e.g., starting a session, ending a session, setting privileges in a session, accounting/tracking of sessions, etc.); participant-related activities (e.g., designating a host, establishing participant privileges, assigning a participant presenter privileges, maintaining participant information, etc.); content sharing-related activities (e.g., designating content to be shared, determining content sharing parameters, implementing sharing of content, formatting shared content, etc.); communication activities (e.g., handling communication between server and the network as well as with the participant devices, transmittal/receipt of shared content, etc.); and the like.

The server 300 also includes a communication interface 312 coupled to bus 302, for providing a two-way data communication coupling server 300 to communication link 314. Communication link 314 typically provides data communication to other networks or devices. Although the illustrated example has one communication interface 312 and one communication link 314, those skilled in the art should readily appreciate that this is for ease of illustration, as the example embodiments described herein may have any physically realizable number of communication interfaces 312, and/or communication links 314. The server 300 may further include at least one input/output interface 316 connected to the bus 302 and in data communication with one or more user interface devices, such as a mouse, keyboard, monitor/screen, audio equipment, video equipment, etc. (not explicitly shown).

Notably, while the illustrative embodiment described below shows a single server as performing the functions described herein, it is understood that the server 300 may comprise, either as a single server or as a collection of servers, one or more memories, one or more processors, and one or more network interfaces (e.g., adapted to communicate traffic for a collaborative computing session and also traffic on a communication channel other than the collaborative computing session), etc., as may be appreciated by those skilled in the art.

Conventional application sharing techniques capture a predefined portion of the presenter's display (e.g., the entire screen or a rectangle within the entire screen) and provide the image within the predefined portion of the presenter's display to the viewer (e.g., "desktop sharing"). All of the applications that have windows positioned within the predefined portion of the presenter's display are captured by the presenter's device, transmitted to the viewer's device, and displayed on the viewer's display. In "application sharing," the presenter selects which particular applications to share with the one or more attendees/viewers of a collaboration session. The presenter's device then provides the shared applications to the viewers' devices.

During a collaborative computing session, the presenter may suitably select at least a portion of the presenter's display to be shared with the other participants in the session. The presenter may also suitably invoke an application program on the presenter's device, such as a word processing program, and designate the application program to be shared with the other participants in the session. This causes the presenter's device to share the output generated by the application program on the presenter's device with the viewers' devices. It is understood that the shared application program is any suitable application, and may include, but is not limited to, a word processing application, a drawing or graphics application, presentation application, spreadsheet application, or other well-known interactive applications from which information is being shared by the presenter with the viewers.

Figure 4:
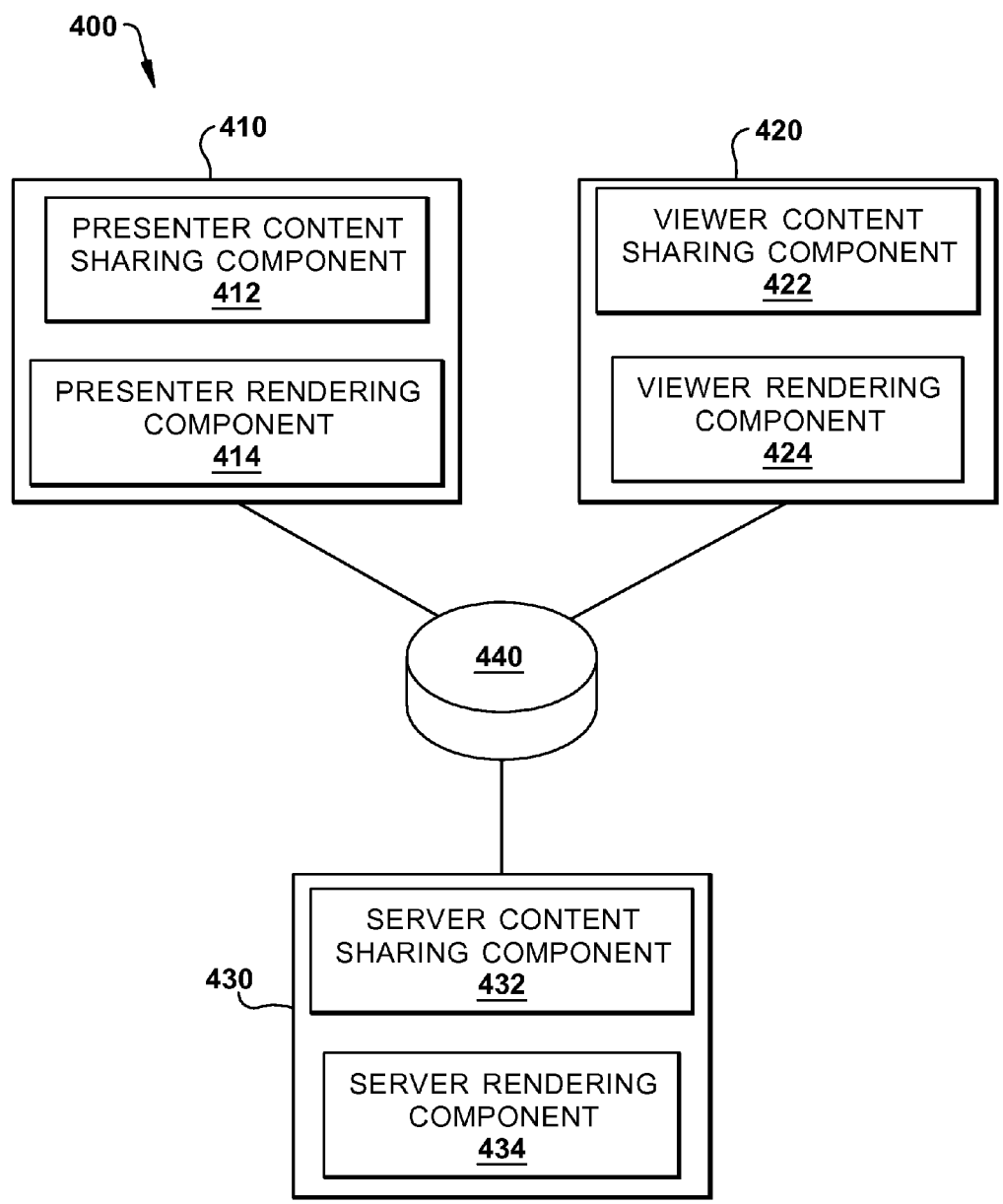
FIG. 4 is a block diagram illustrating an example computer network for content sharing in collaborative computing sessions.

FIG. 4 illustrates an alternative view of network 100 (as shown in FIGS. 1-3) in accordance with content sharing. For instance, participant devices, may be further represented as further detailed in FIG. 4, to include a presenter device 410 and at least one viewer device 420. Presenter device 410 may comprise presenter content sharing component 412, which may be any type of suitable software that enables presenters and viewers to share applications, documents, or the like. Selection of content for sharing is suitably accomplished via keyboard, touchscreen, verbal command, audio command or mouse selection in accordance with functionality available. Presenter device 410 may also comprise a rendering component 414 for rendering and/or formatting content to be transmitted to the viewers' devices. Presenter device 410 may also include other components that are not shown or discussed for simplicity.

It is to be understood that presenter content sharing component 412 and participant rendering component 414 may suitably be implemented as logic operable to be executed by participant device processor 204, as shown in FIG. 2. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Viewer device 420 may also include viewer content sharing component 422, which may be any type of suitable software that enables presenters and viewers to share applications, documents, or the like. Viewer content sharing component 422 may be similar to or the same as presenter content sharing component 412. Viewer content sharing component 422, among other things, receives content from the presenter's device for display on the viewer's device. Viewer device 420 may also comprise a viewer rendering component 424 for rendering and/or formatting content to be displayed on the viewer's device. It is to be understood that viewer content sharing component 422 and viewer rendering component 424 may suitably be implemented as logic operable to be executed by participant device processor 204, as shown in FIG. 2.

Server 430 may also include server content sharing component 432, which may be any type of suitable software that enables presenters and viewers to share applications, documents, or the like. Server 430 may also comprise a server rendering component 434 for rendering and/or formatting content to be transmitted by a presenter device to a viewer's device, content to be displayed on the viewer's device, or a combination thereof. It is to be understood that server content sharing component 432 and server rendering component 434 may suitably be implemented as logic operable to be executed by server processor 304, as shown in FIG. 3.

It is to be understood that the rendering components 414, 424, and 434 suitably render, format, or otherwise modify the shared content for suitable transmission thereof to at least one viewer device, for suitable display thereof on at least one viewer device, and combinations thereof. As used herein, the phrase "render" may be used to describe such rendering, formatting, or modification of the content, and may include rendering content in accordance with received video content, video-to-text converted content, audio content, audio-to-text converted content, textual content, and/or combinations thereof.

According to collaborative content sharing, a presenter may select at least a portion of the presenter's display and/or at least one particular application to share with one or more attendees/viewers of a collaboration session. The presenter's device may then transmit, such as via presenter content sharing component 412, the shared content to the viewer's device, such as via viewer content sharing component 422, over network 440. It is understood that in an example embodiment, the server 430, together with the server content sharing component 432, may be configured to receive all or a selected portion of content from the presenter device and transmit the received content to the designated viewer devices. The server 430, together with the server rendering component 434, may also be configured to render at least a portion of the content received from the presenter device. In one embodiment, the server 430 may suitably render at least a portion of the content received from the presenter device and transmit the rendered content to the designated viewer devices. In another embodiment, the server 430 may suitably render at least a portion of the content received from the presenter device, and then transmit the rendered content back to the presenter device for transmission therefrom to the designated viewer devices.

Figure 5:
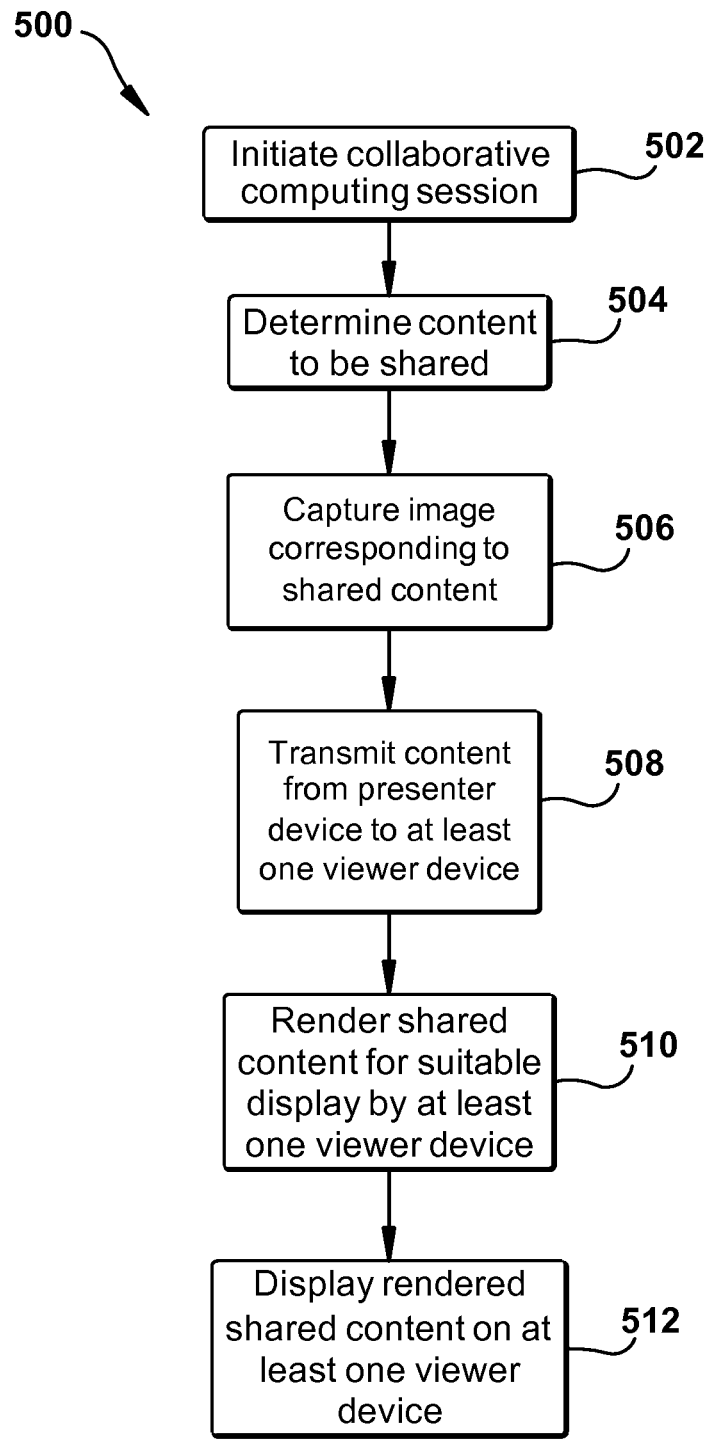
FIG. 5 illustrates an example of a methodology for sharing content in a collaborative computing session.
Figure 9:
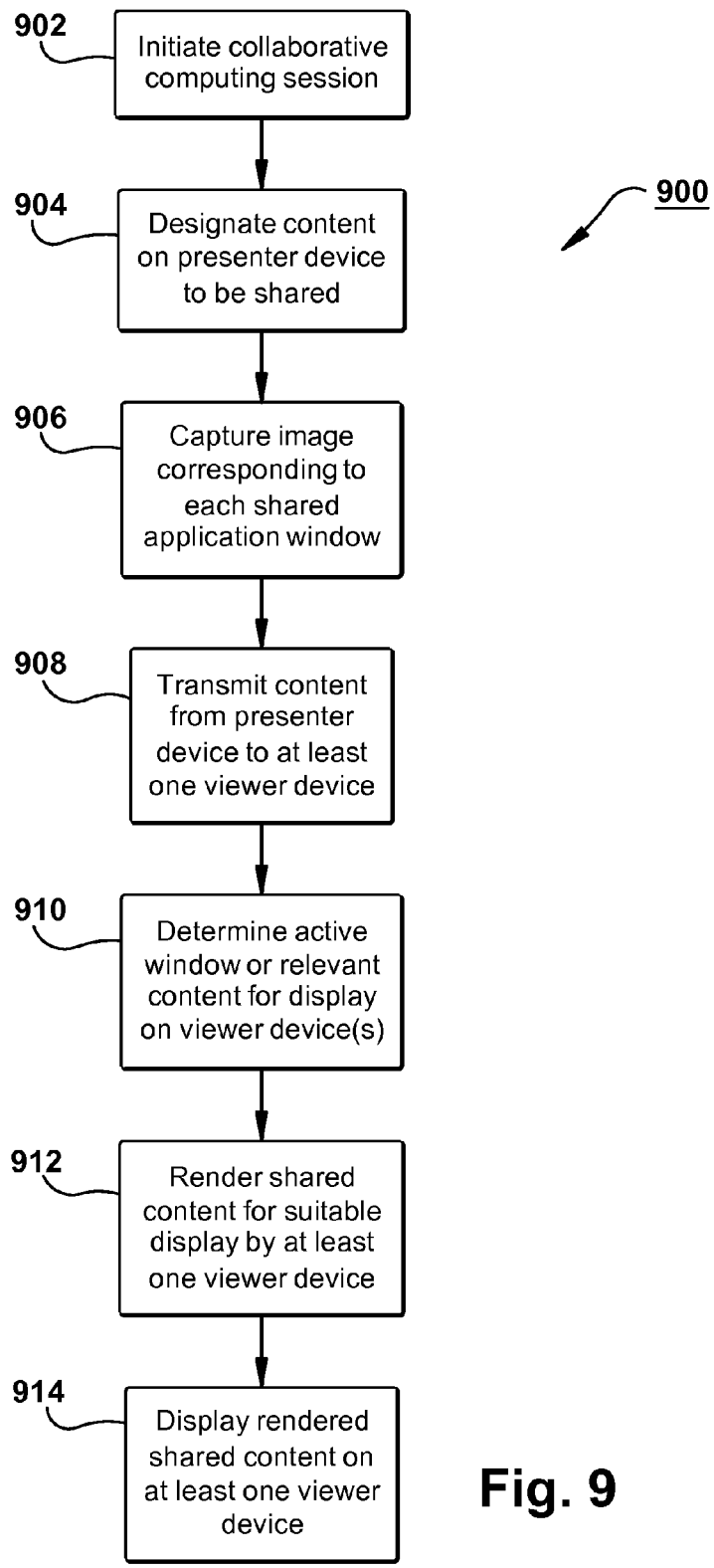
FIG. 9 illustrates an example of a methodology for content sharing in a collaborative computing session.
Figure 11:
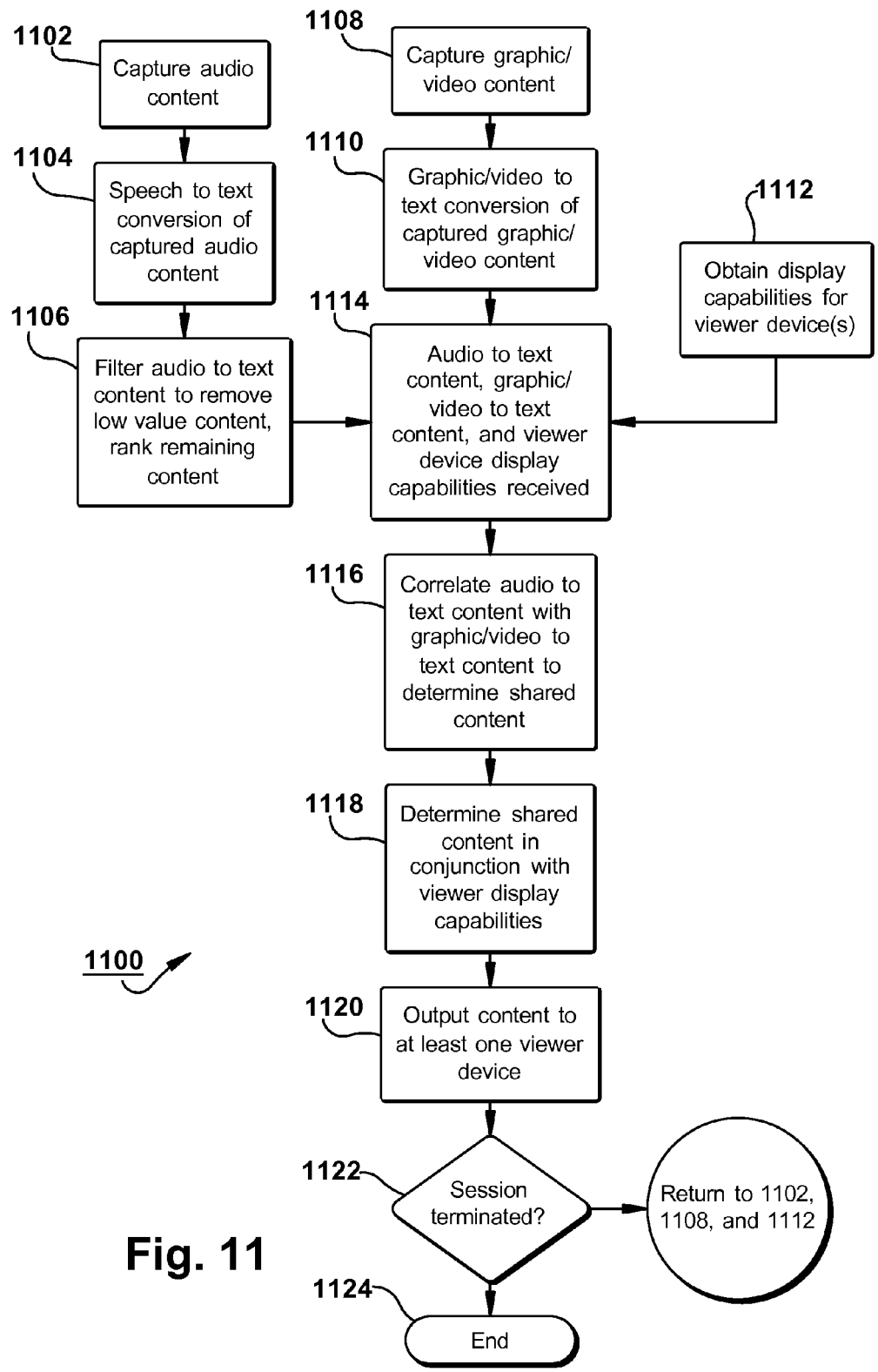
FIG. 11 illustrates an example of a methodology for determining content to be shared during a collaborative computing session.

In view of the foregoing structural and functional features described above, methodologies in accordance with example embodiments will be better appreciated with reference to FIGS. 5, 9 and 11. While, for purposes of simplicity of explanation, the methodologies of FIGS. 5, 9, and 11 are shown and described as executing serially, it is to be understood and appreciated that the example embodiment is not limited by the illustrated order, as some aspects could occur in different orders and/or concurrently with other aspects from that shown and described herein. Moreover, in accordance with an example embodiment, not all illustrated features may be required. The methodologies described herein are suitably adapted to be implemented in hardware, software, or a combination thereof. For example, the methods may be implemented by participant devices 102, server 104, or combinations thereof.

FIG. 5 is a flow chart of an example method 500 for sharing content in collaborative computing sessions as described herein. Method 500 may suitably be implemented on a system for content sharing in collaborative computing sessions as described herein.

At 502, a collaborative computing session is initiated among a plurality of participant devices 200, as is known in the art. For example, the collaborative computing session initiation process may suitably occur in a participant device 200 through interaction with server 300, or through server 300, with interaction with at least one participant device 200. Participant devices 200 may join the collaborative computing session through login and/or authentication processes or protocols as are known in the art. At least one of the participant devices is designated as a presenter device 410, such as the meeting host or coordinator, wherein such presenter device includes a presenter content sharing component 412 operating to allow the presenter device to share selected content with other participant devices or viewer devices 420, as will be described in detail below.

It is to be understood that more than one participant device may be designated as a presenter device. It is also to be understood that the presenter device designation may change during the collaborative computing session. For example, at the start of a session, a first participant device may be designated as the presenter device, and then later in the session a second participant device may be designated as the presenter device, wherein the first participant device may be suitably designated as a viewer device.

At 504, the presenter, via the presenter device 410 selects or otherwise determines content to be shared with the other participants in the session as is known in the art. The presenter may suitably select at least a portion of the presenter device's display to be shared with the other participants in the session. The presenter may also suitably invoke an application program on the presenter's device, such as a word processing program, and designate the application program to be shared with the other participants in the session.

At 506, an image or data corresponding to (or "within") the shared content on the presenter device is captured so that it can be provided to the viewer devices as is known in the art. This step may be performed periodically (e.g., five times per second) so that changes to the presenter's display are quickly reflected on the viewer devices. Illustratively, the image or data corresponding to the shared content can be captured by capturing portions of the frame buffer on the presenter device that correspond to the shared content.

At 508, the selected content to be shared by the presenter device 410 is transmitted via suitable means, such as via the network 106, to at least one viewer device 420 for sharing thereof. It is understood that in some embodiments, the shared content may be transmitted directly from the presenter device 410 to at least one viewer device 420. It is further understood that in other embodiments, at least a portion of the shared content is transmitted from the presenter device 410 to the server 430, and then the server transmits such shared content to the at least one viewer device 420.

At 510, the shared content is rendered, via a rendering component, for suitable display on the at least one viewer device. The illustrated example depicts that the shared content is transmitted from the presenter device 410 to the at least one viewer device 420, and then the shared content is rendered accordingly. However, it is understood that in some embodiments, the shared content may be rendered for display on the at least one viewer device prior to transmission of the content to the at least one viewer device.

In one embodiment, the presenter device 410, via the presenter device rendering component 414, may render the shared content for at least one viewer device, for several specified viewer devices, for all of the viewer devices, or combinations thereof, and then transmit the rendered shared content accordingly. In another embodiment, the presenter device 410 may transmit at least a portion of the shared content to the server 430. The server 430, via the server rendering component 434, may render the shared content for at least one viewer device, for several specified viewer devices, for all of the viewer devices, or combinations thereof, and then transmit the rendered shared content accordingly. In another embodiment, the presenter device 410, either directly or via the server 430, may transmit the shared content to the viewer device 420. The viewer device will then suitably render the received shared content for suitable display on the viewer device. In yet another embodiment, the presenter device 410 and/or the server 430 may perform a render operation on the shared content, and then transmit the content to the at least one viewer device. The viewer device 420 may suitably perform a further rendering operation on the received shared content for suitable display on the viewer device.

At 512, the shared content is displayed on the at least one viewer device 420. The presenter and the other participants may then simultaneously view the shared content, and interact with each other regarding the shared content.

It is to be appreciated that the participant devices 200, including both the presenter device 410 and the viewer device 420, can range from full capability workstation or desktop computing systems to handheld portable devices, such as a cellular telephone or personal digital assistant with less or limited rendering and/or sharing capability. The system and methods set forth herein are suitably robust to address and account for all ranges of participant device capabilities.

In conventional desktop or application sharing, the presenter designates at least a portion of the presenter's display to be shared; an application program, including all windows associated with such application to be shared; or a combination thereof. The content as displayed on the presenter's device is then displayed on the viewer devices. The content as displayed on the presenter's device may include background regions or content that is not relevant to the viewer. For example, if the presenter designates an application to be shared, such application may have several windows associated with the application and displayed on the presenter device. Typically, there are windows or regions that are not relevant to the viewer for at least some, or all, of the collaborative computing session.

Further, during the collaborative computing session, the presenter and/or the viewers may desire to include additional content, remove content, focus on certain content in greater detail, minimize the focus on other content, and the like. As such, the relevant content, or active content, to the collaborative computing session may change or be updated periodically during the session. For example, the presenter may have designated a word processing application to share, wherein the application has three active windows. During the session, the presenter may turn the focus to content presented in one particular active window. In such a situation, the presenter and/or the viewers may only want to focus on the content of that window, and limit the focus on the other two active windows. As such, the presenter and/or the viewers may desire that the content of the relevant window be prominently displayed on the viewer devices while such content is the focus of the session, while minimizing the display of the content of the other windows.

It is to be understood that the presenter and/or the viewers may change the focus of the session, wherein the content of one of the other two active windows is relevant. In such a situation, the presenter and/or the viewers may desire that the content of that window be prominently displayed on the viewer devices, while minimizing the display of other shared content. It is also to be understood that the presenter and/or the viewers may change the focus of the session or the active window or windows numerous times during a collaborative computing session, and that each time, the presenter and/or the viewers may desire that the content of the relevant or active windows be prominently displayed on the viewer devices.

Figure 6:
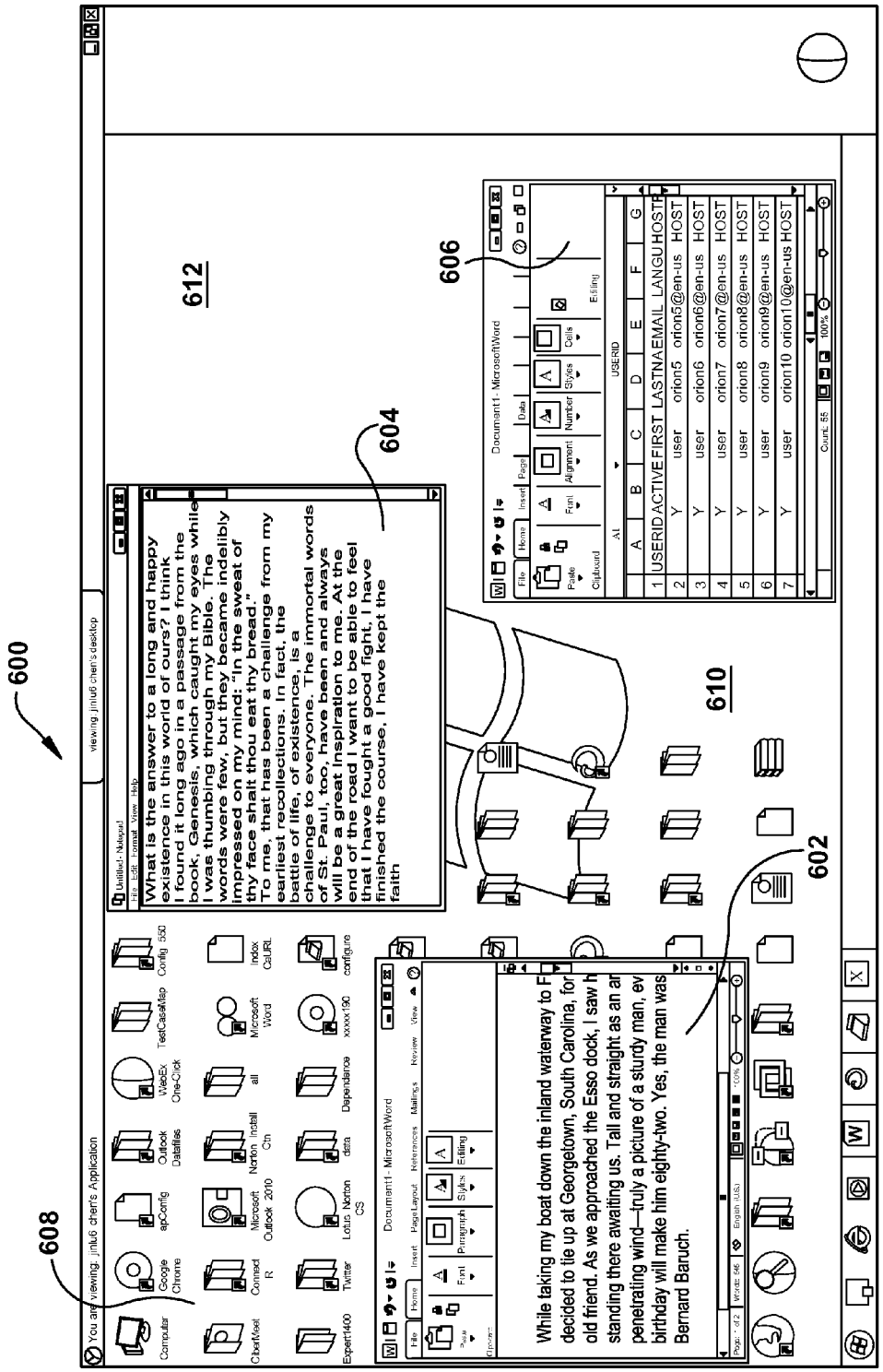
FIG. 6 illustrates an example display for a presenter device.

An example of a display 600 of a presenter device, wherein the presenter has enabled desktop sharing during a collaborative computing session with other viewer devices, is illustrated in FIG. 6. As illustrated in FIG. 6 windows or regions 602, 604, and 606 are relevant to or the current focus of the collaborative computing session. The other regions 608, 610, and 612 of the display 600 are not of primary relevance or currently active, or possibly of any relevance, to the participants of the collaborative computing session. Regions 608, 610, and 612, which are not of primary relevance or currently active, will be referred to herein as "background regions".

Figure 7:
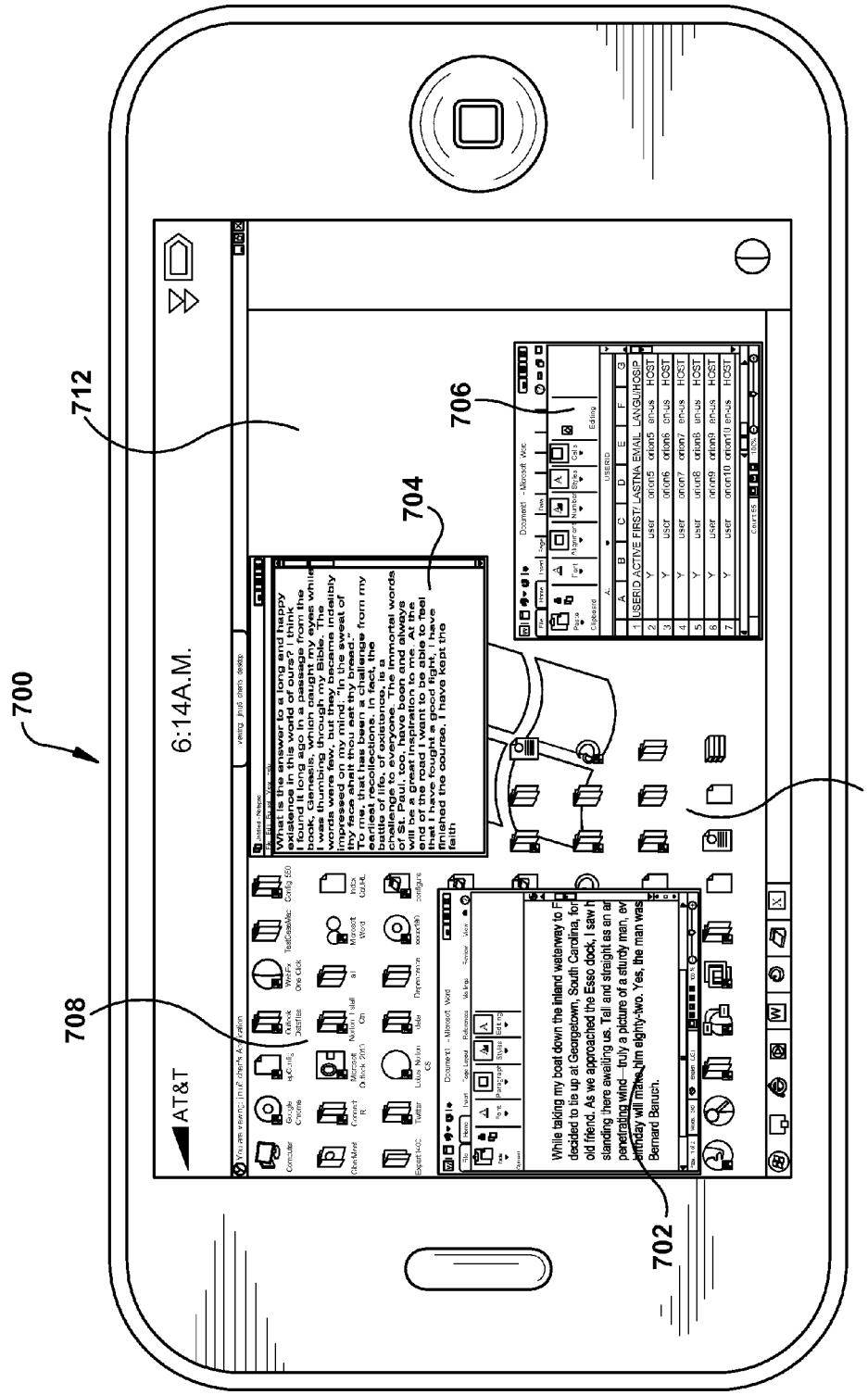
FIG. 7 illustrates an example display for a viewer device.

When the shared content as illustrated in FIG. 6 is transmitted to a viewer device, without rendering the content for suitable display on the viewer device, the content is displayed on the viewer device as it is displayed on the presenter device. An example of a viewer display 700 of shared content transmitted without rendering is shown in FIG. 7. The display includes relevant windows or regions 702, 704, 706, as well as background regions 708, 710, and 712, which are not of primary relevance to the viewer. If the participant is viewing the shared content on a viewer device having a small display, such as a handheld portable device, as shown in FIG. 7, the shared content may be difficult to view or comprehend due to the small size of the display.

Figure 8:
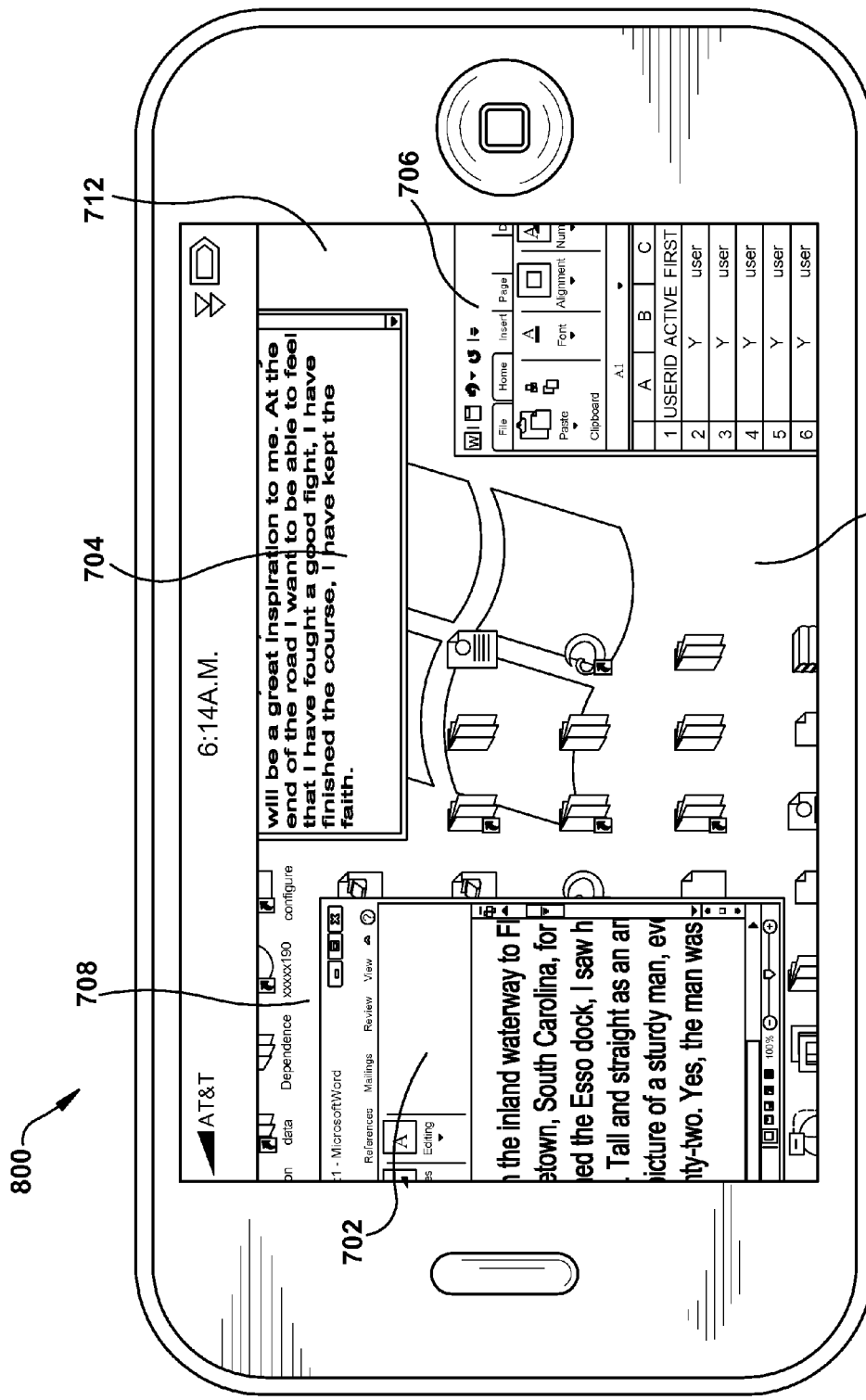
FIG. 8 illustrates an example display for a viewer device.

In such situations, the viewer may desire to enlarge or increase the size of the shared content for easier viewing of the content. For instance, the user may zoom into or otherwise enlarge at least a portion of the shared content by any suitable means for the particular viewer device. FIG. 8 is a display 800 on a viewer device wherein the shared content has been increased in size or enlarged. As illustrated in FIG. 8, due to the small size of the screen, enlarging the shared content results in the viewer not being able to view all of the relevant windows 702, 704, and 706 at the same time.

FIG. 9 is a flow chart of an example method 900 for sharing content in collaborative computing sessions as described herein. Method 900 may suitably be implemented on a system for content sharing in collaborative computing sessions as described herein.

At 902, a collaborative computing session is initiated among a plurality of participant devices 200, as is known in the art and as discussed above. At least one of the participant devices is designated as a presenter device 410, such as the meeting host or coordinator, wherein such presenter device includes a presenter content sharing component 412 operating to allow the presenter device to share selected content with other participant devices or viewer devices 420, as will be described in detail below.

It is to be understood that more than one participant device may be designated as a presenter device. It is also to be understood that the presenter device designation may change during the collaborative computing session. For example, at the start of a session, a first participant device may be designated as the presenter device, and then later in the session a second participant device may be designated as the presenter device, wherein the first participant device may be suitably designated as a viewer device.

At 904, the presenter, via the presenter device 410 selects or otherwise determines content to be shared with the other participants in the session as is known in the art. The presenter may suitably select at least a portion of the presenter device's display to be shared with the other participants in the session. The presenter may also suitably invoke an application program on the presenter's device, such as a word processing program, and designate the application program to be shared with the other participants in the session.

In an example embodiment, the shared content may be selected or designated based on content type, content importance, user activity associated with the content, other content characteristics or features, and combinations thereof. In another example embodiment, the shared content may be selected or designated by the user, by the presenter device via the presenter content sharing component, by the viewer device by the viewer sharing component, by the server by the server content sharing component, and combinations thereof.

In an example embodiment, the shared content is suitably designated based on a determined activity or relevance of selected windows or content regions displayed on the presenter device. As an example, the presenter device may have multiple applications running or executing thereon, with each application including at least one active or open window associated therewith. For instance, the presenter device may have a word processing application executing with two active document windows, an email application program executing with one active window, and a graphics application with two active windows, as well as the background window.

As discussed above, the active content, or relevant content, to the collaborative computing session may change or be updated periodically during the session. For example, the presenter may have designated a word processing application to share, wherein the application has three active windows related to marketing materials for a new product. During the session, the presenter may turn the focus to a particular feature of the new product, and such feature may be described in detail in one of the active windows. In such a situation, the presenter and/or the viewers may only want to focus on the content of that window, or at least a portion thereof, and limit the focus on the other two active windows. As such, the presenter and/or the viewers may desire that the content of the relevant window be prominently displayed on the viewer devices while such content is the focus of the session, while minimizing the display of the content of the other windows.

It is to be understood that the presenter and/or the viewers may change the focus of the session, wherein the content of one of the other two active windows is relevant. In such a situation, the presenter and/or the viewers may desire that the content of that window be prominently displayed on the viewer devices, while minimizing the display of other shared content. It is also to be understood that the presenter and/or the viewers may change the focus of the session or the active window or windows numerous times during a collaborative computing session, and that each time, the presenter and/or the viewers may desire that the content of the relevant or active windows be prominently displayed on the viewer devices. For simplicity purposes, "window" will refer to an application, a window associated with an application, and/or background windows or regions. For simplicity purposes, "window" will also refer to a single window, a group of windows, a portion of a window, and combinations thereof.

At 906, an image or data corresponding to (or "within") the shared content on the presenter device is captured so that it can be provided to the viewer devices as is known in the art. This step may be performed periodically (e.g., five times per second) so that changes to the presenter's display are quickly reflected on the viewer devices. Illustratively, the image or data corresponding to each shared window can be captured by capturing portions of the frame buffer on the presenter device that correspond to the shared windows.

At 908, the selected content to be shared by the presenter device 410 is transmitted via suitable means, such as via the network 106, to at least one viewer device 420 for sharing thereof. It is understood that in some embodiments, the shared content may be transmitted directly from the presenter device 410 to at least one viewer device 420. It is further understood that in other embodiments, at least a portion of the shared content is transmitted from the presenter device 410 to the server 430, and then the server transmits such shared content to the at least one viewer device 420. In an example embodiment, prior to transmission, the image or data corresponding to the shared content may be suitably compressed using known compression techniques, such as GZIP or JPEG.

At 910, the active window or relevant content is determined for prominent display on a viewer device 420 during a collaborative computing session, or a portion thereof. The active window will suitably include content relevant to the collaborative computing session, or at least the current focus of the collaborative computing session. In an example embodiment, the presenter device 410, via the presenter content sharing component, may determine the active window or windows, or portions thereof, in order to designate or determine the content to be shared with the viewer devices. It is understood that the server 430, via the server content sharing component, may suitably determine or assist in the determination of the active window or windows, or portions thereof. It is further understood that the viewer device 420, via the viewer content sharing component, may assist in the determination of the active window or windows, or portions thereof, as is needed for efficient display by a viewer device.

In an example embodiment, the active window for prominent display on a viewer device 420 during a collaborative computing session, or a portion thereof, is suitably determined as a function of the content of any accompanying audio content in correlation with the designated shared content on the presenter device 410. For example, the presenter may have designated a word processing application to share, wherein the application has three active windows related to marketing materials for a new product. During the session, the presenter may turn the focus to a particular feature of the new product, and the presentation or discussion would then suitably be focused on that particular feature. In an example embodiment, the audio content would suitably be analyzed to determine the relevant content or focus of the presentation, such as by analysis of the discussion thread, the use of specified keywords, or other suitable speech recognition mechanisms known in the art. In correlation with the analysis of the audio content to determine the relevant content, the shared content on the presenter's device is analyzed to determine which of the shared content or window is relevant or related to the relevant audio content. In an example embodiment, the content to be shared with a viewer device is determined based on the analysis of the audio content in correlation with an analysis of the shared windows, such that the window, windows, or portions thereof, relevant to the audio content, are prominently displayed on the viewer device. Further, windows which are not relevant or are less relevant to the audio content are suitably minimized on the display.

In an example embodiment, the analysis of the audio content to determine the relevant content or current focus of the presentation may suitably be performed by any suitable speech recognition systems or methods known in the art. In an example embodiment, the analysis of the audio content is suitably performed using speech to text conversion to convert the audio content to text. The text is then analyzed to determine the relevant content. In conjunction with the audio analysis, the active or shared windows on the presenter device are analyzed to determine the content thereof. The content of the active windows on the presenter device is then compared to the relevant audio content, and the active window, windows, or portions thereof, having content relevant to or relating to the audio content, are then designated to be shared.

As will be discussed in detail below, the parameters for shared content on a viewer device, such as the amount of content, window size, etc., are based, in part at least, on the display capabilities for the viewer device. Therefore, in a preferred embodiment, a viewer device may suitably determine the shared content for such viewer device. In another embodiment, the presenter device and/or the server may assist in the determination of the shared content for such viewer device.

At 912, the shared content is rendered, via a rendering component, for suitable display on the at least one viewer device. The illustrated example depicts that the shared content is transmitted from the presenter device 410 to the at least one viewer device 420, and then the shared content is rendered accordingly. However, it is understood that in some embodiments, the shared content may be rendered for display on the at least one viewer device prior to transmission of the content to the at least one viewer device.

In one embodiment, the presenter device 410, via the presenter device rendering component 414, may render the shared content for at least one viewer device, for several specified viewer devices, for all of the viewer devices, or combinations thereof, and then transmit the rendered shared content accordingly. In another embodiment, the presenter device 410 may transmit at least a portion of the shared content to the server 430. The server 430, via the server rendering component 434, may render the shared content for at least one viewer device, for several specified viewer devices, for all of the viewer devices, or combinations thereof, and then transmit the rendered shared content accordingly. In another embodiment, the presenter device 410, either directly or via the server 430, may transmit the shared content to the viewer device 420. The viewer device will then suitably render the received shared content for suitable display on the viewer device. In yet another embodiment, the presenter device 410 and/or the server 430 may perform a render operation on the shared content, and then transmit the content to the at least one viewer device. The viewer device 420 may suitably perform a further rendering operation of the received shared content for suitable display on the viewer device.

In an example embodiment, the shared content is rendered for suitable display for at least one viewer device based on the capabilities of the at least one viewer device. As an example, if the viewer device is a handheld portable device having a small display, the shared content will be suitably rendered for display to efficiently use the display area for the shared content. In an example embodiment, the shared content is suitably rendered for display on the handheld portable device to ensure that the relevant content is predominantly displayed for viewing by the user of the device, while minimizing the display of less relevant content.

In an example embodiment, the shared content is rendered for suitable display on the at least one viewer device, such that the relevant content is displayed in the central portion of the viewer display, and the less relevant content is displayed on the periphery of the display, if displayed at all.

It is understood that each viewer device may have differing capabilities which will provide for different display configurations. For example, one handheld portable device, such as tablet, may have a larger display than another handheld portable device, such as a cellular telephone. As such, the rendering required (e.g., minimization of background regions) for the tablet may suitably be less than the rendering required for the cellular telephone. It is understood that the rendering component of the presenter device, the viewer device, the server device, or a combination thereof will suitably provide the rendering required in accordance with each device's capabilities.

At 914, the shared content is displayed on the at least one viewer device 420.

Figure 10:
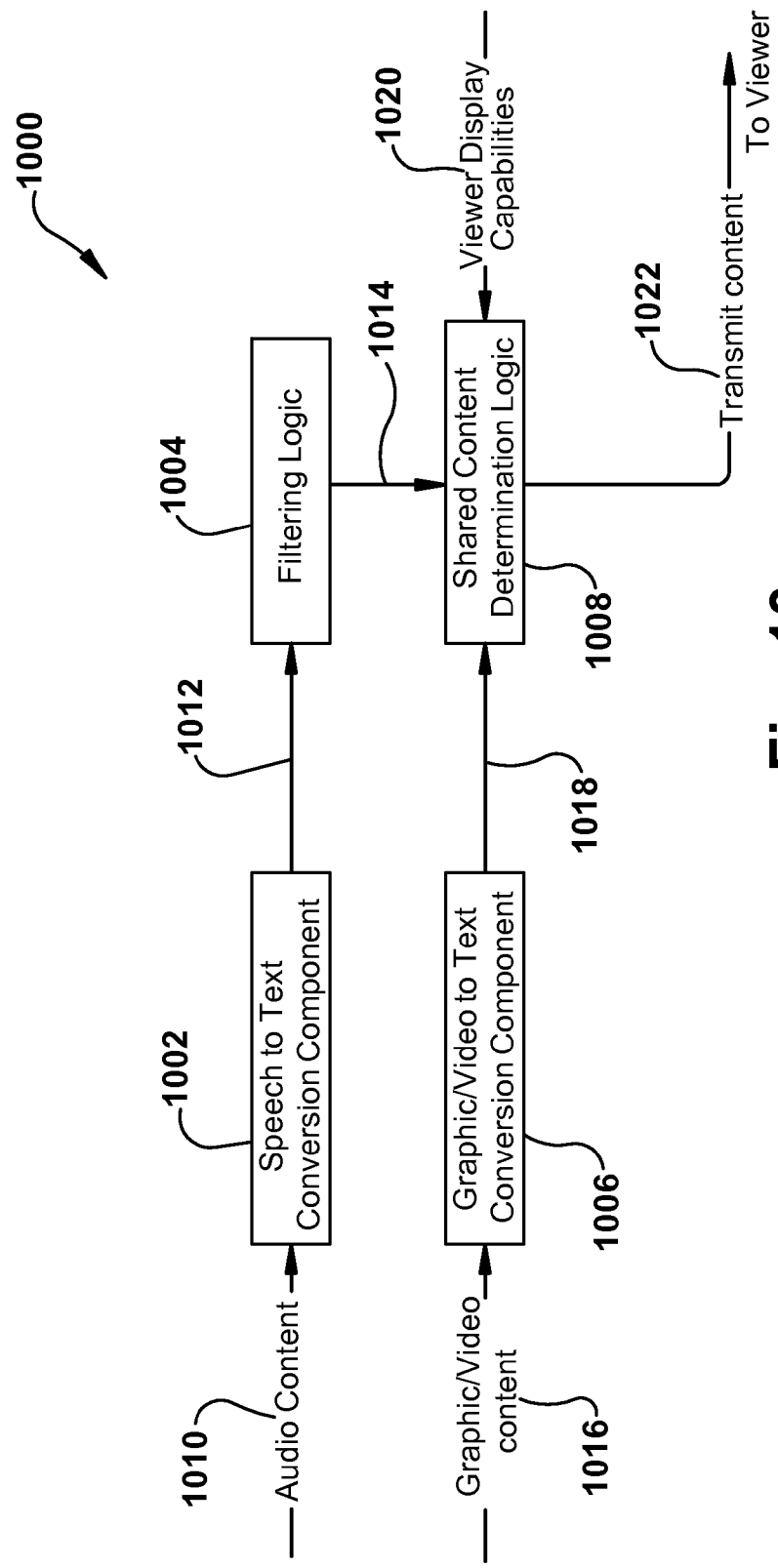
FIG. 10 illustrates an example architecture for determining content to be shared during a collaborative computing session.

FIG. 10 illustrates a schematic block diagram of an example architecture for a content selection component 1000 for determining content to be shared by a presenter device with viewer devices in a collaborative computing session. In an example embodiment, the content selection component includes a speech to text conversion component 1002, filtering logic 1004, a graphic/video content to text conversion component 1006, and a shared content determination logic 1008. The content selection component 1000 may suitably comprise logic for implementing the functionality described herein. It is to be understood that the content selection component may be implemented on the presenter device, the viewer device, the server, and combinations thereof, or as a stand-alone component accessible by the presenter device, the viewer device, and the server. Notably, while the illustrated embodiment describes a single content selection component 1000, merely for ease of illustration and that the example embodiments described herein may suitably comprise any physically realizable number of content selection components as needed to perform the functionality described herein.

In an example embodiment, audio input streams 1010 containing audio content are received from at least a portion of the participant devices 200, such as the presenter device and viewer devices, by the speech to text conversion component 1002. The audio input streams include audio signals or content originating from the participant devices. For example, the presenter may suitably be discussing additional details concerning the content shared on the presenter device, wherein such discussion is received and processed by a suitable audio input/output interface on the presenter device and transmitted by input stream 1010 to speech to text conversion component 1002. It is understood that any of the participant devices having a suitable audio input/output interface may provide audio signals therefrom to the speech to text conversion component 1002 for processing thereof.

In an example embodiment, the speech to text conversion component 1002 suitably converts the audio content received from the participant devices to text via any suitable process, system, algorithm, or the like for interpreting and parsing speech from the participants as is known in the art. The speech to text conversion component 1002 transmits data from the speech to text conversion process to filtering logic 1004 via text (audio) output stream as illustrated by 1012 and as is known in the art. An example of such an output is discussed with respect to FIG. 12 below. The speech to text conversion component 1002 may suitably transmit the data continuously as it is converted, as a batch process, and combinations thereof, as is suitable or required for the efficient display of shared content on the viewer devices.

In an example embodiment, the filtering logic 1004 suitably filters out or removes content that is not of high value or relevant to the current focus of the collaborative computing session. The filtering logic 1004 suitably filters out such content by any suitable process, system, algorithm, or the like as is known in the art. For example, the filtering logic 1004 may suitably filter out conversational content between the participants, such as greetings; topics unrelated to the session, such as a discussion about the weather, sports, and the like; low value content, such as articles, prepositions, pronouns, conjunctions, interjections, and the like; and other content not relevant or related to the focus of the session. It is to be understood that the filtering logic 1004 may not remove or delete lower value content, but will not analyze or further process such content in the determination of the active window or windows.

In an example embodiment, once the filtering logic 1004 suitably filters out content that is not of high value and/or not relevant to the current focus of the collaborative computing session, the remaining content is further analyzed to determine which of the remaining content is of higher relevance to the focus of the session. For example, the remaining content may suitably be analyzed to determine those words or phrases used more frequently than other words and/or phrases, and those words and/or phrases may be ranked higher or given more value than other words or phrases. In another example, the remaining content may be suitably analyzed to determine if the content contains any specified key words and/or phrases, wherein such key words and/or phrases are ranked higher or given more value than other words or phrases. It is to be understood that the determination as to which words and/or phrases are regarded as key word or phrases may suitably be based on parameters provided by the presenter, the other participants, and combinations thereof, and/or by the presenter content sharing component, the viewer sharing component, the server sharing component, the shared content selection component, and combinations thereof. It is further to be understood that the specified key words and/or phrases may suitably be modified or updated during the session as necessary. In an example embodiment, the remaining content is suitably ranked or valued accordingly by the filtering logic 1004, and the ranked content is transmitted to the shared content determination logic 1008 via any suitable means known in the art as illustrated at 1014. The ranked content is transmitted to the shared content determination logic 1008 for further processing as discussed in detail below.

In an example embodiment, in conjunction with the analysis of the audio content of the collaborative computing session, the shared graphic and/or video content is also suitably analyzed as to the content contained therein. As discussed above, in an example embodiment, images and/or data corresponding to (or "within") the shared content on the presenter device are captured periodically (e.g., five times per second) so that changes to the presenter's display are quickly reflected on the viewer devices. Illustratively, the images and/or data corresponding to each shared window can be captured by capturing portions of the frame buffer on the presenter device that correspond to the shared windows.

It is to be understood that more than one participant device may be designated as a presenter device. It is also to be understood that the presenter device designation may change during the collaborative computing session. For example, at the start of a session, a first participant device may be designated as the presenter device, and then later in the session a second participant device may be designated as the presenter device, wherein the first participant device may be suitably designated as a viewer device. It is to be understood that images and/or data may suitably be captured from each such presenter device.

In an example embodiment, graphic/video input stream 1016 containing the captured images and/or data is received from the presenter device by the graphic/video to text conversion component 1006. The shared graphic and/or video content is suitably captured and processed by a suitably graphic/video input/output interface on the presenter device and transmitted to the graphic/video to text conversion component 1006 as is known in the art.

In an example embodiment, the graphic/video to text conversion component 1006 suitably converts the captured graphic/video content received from the presenter device to text via any suitable process, system, algorithm, or the like as is known in the art. In an example embodiment, the graphic/video to text conversion component uses optical character recognition to convert the captured graphic/video content to text via any suitable optical character recognition process or apparatus as is known in the art.

In an example embodiment, the graphic/video to text conversion component 1006 transmits data from the graphic/video to text conversion process to shared content determination logic 1008 via text (graphic/video) output stream as illustrated by 1018 and as is known in the art. The graphic/video to text conversion component 1006 may suitably transmit the data continuously as it is converted, as a batch process, and combinations thereof, as is suitable or required for the efficient display of shared content on the viewer devices.

In an example embodiment, the shared content determination logic 1008 analyzes the ranked audio to text content received from the filtering logic 1004 in conjunction with the graphic/video to text content received from the graphic/video to text conversion component 1006 to determine the active window or relevant content to be displayed on each viewer device. In an example embodiment, the shared content determination logic 1008 suitably divides the captured images and/or data as displayed on the presenter device into a number of units or cells as is needed to determine the shared content. For example, the shared content determination logic divides the captured images and/or data as displayed on the presenter device into a set number of equal sized units or cells, such as a grid eight (8) cells in height and eight (8) cells in width, for a total of 64 cells.

In an example embodiment, the shared content determination logic 1008 suitably analyzes each cell to determine the value or rank of the content in each cell based on the ranked audio to text content received from the filtering logic 1004. In an example embodiment, the shared content determination logic 1008 may suitably determine the frequency of high value words and/or phrases, key words and/or phrases, or the like in each cell. As an example, certain words and/or phrases may have a higher value than other words and/or phrases. As such, a cell having a higher frequency of high value words will have a higher rank than a cell with a lower frequency of high value words or a cell with lower value words.

Figure 13:
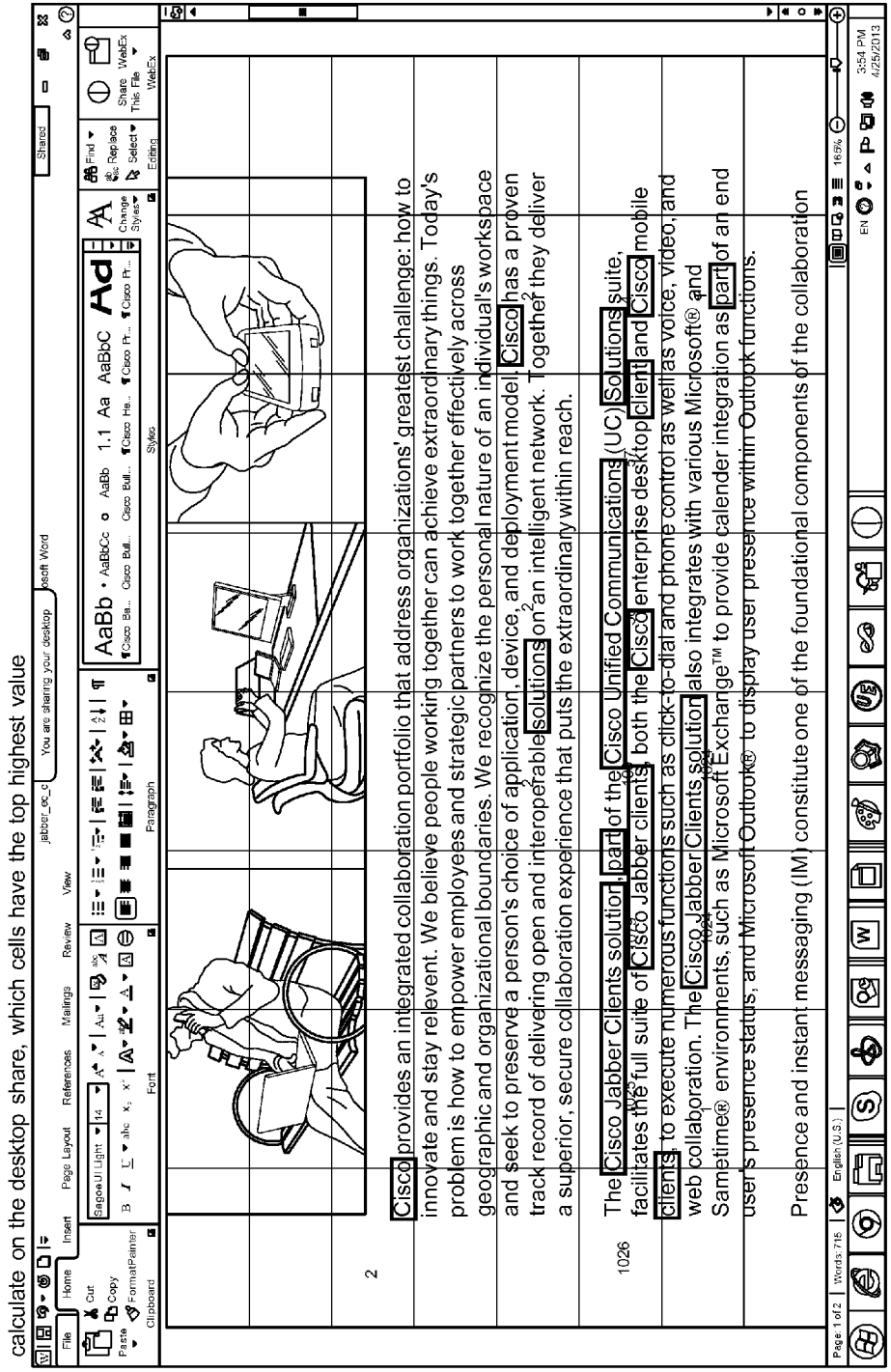
FIG. 13 illustrates an example of ranked converted graphic/video to text content.

In an example embodiment, the shared content determination logic 1008 suitably determines the rank for each cell, and then uses the rank of each cell to determine matches between the content of each cell and the ranked audio to text content. As an example, the cells with the highest rank or the best match with the ranked audio to text content are suitably selected as candidates for the active window or the content to be shared with each viewer device. An example is illustrated in FIG. 13, which will be discussed in detail below.

In an example embodiment, the shared content determination logic 1008 suitably receives data related to the display capabilities or display configuration for at least one viewer device via any suitable means as illustrated at 1020. The data related to the display capabilities for a select viewer device may be received or determined by the presenter device, the viewer device, the server, and combinations thereof.

In an example embodiment, the shared content determination logic 1008 suitably designates the active window or shared content, as well as the parameters for such shared content as to be displayed on a viewer device. As an example, the shared content determination logic 1008 suitably determines the parameters for the display of the shared content on a viewer device, such as the amount of content, window size, etc., based, in part at least, on the display capabilities for such viewer device. As an example, if the viewer device is a handheld portable device having a small display, the shared content will be suitably selected to efficiently use the display area for the shared content. It is understood that the shared content determination logic 1008 may suitably designate the active window or shared content for each viewer device separately, for all viewer devices, for a portion of the viewer devices, and combinations thereof.

In an example embodiment, the shared content determination logic 1008 may suitably determine that a plurality of active windows displayed on the presenter device are candidates for sharing with the viewer devices. In such a situation, the shared content determination logic 1008 will suitably select the window with the highest possible match as the active window to be shared. In an example embodiment, if the presenter does not agree with the selection of such window as the best match, the presenter may suitably designate another active window as the best match for sharing with the viewer devices. As an example, the presenter may suitably be provided with a listing of the highest ranked active windows as determined by the shared content determination logic 1008, and the presenter may select therefrom the active window.

In an example embodiment, wherein the presenter is provided a listing of the highest ranked active windows, the presenter may decide that none of the active windows listed therein are the best match or are suitable for sharing. In an example embodiment, the presenter may suitably manually select a window, or portion thereof, to be shared, as is known in the art.

Figure 16:
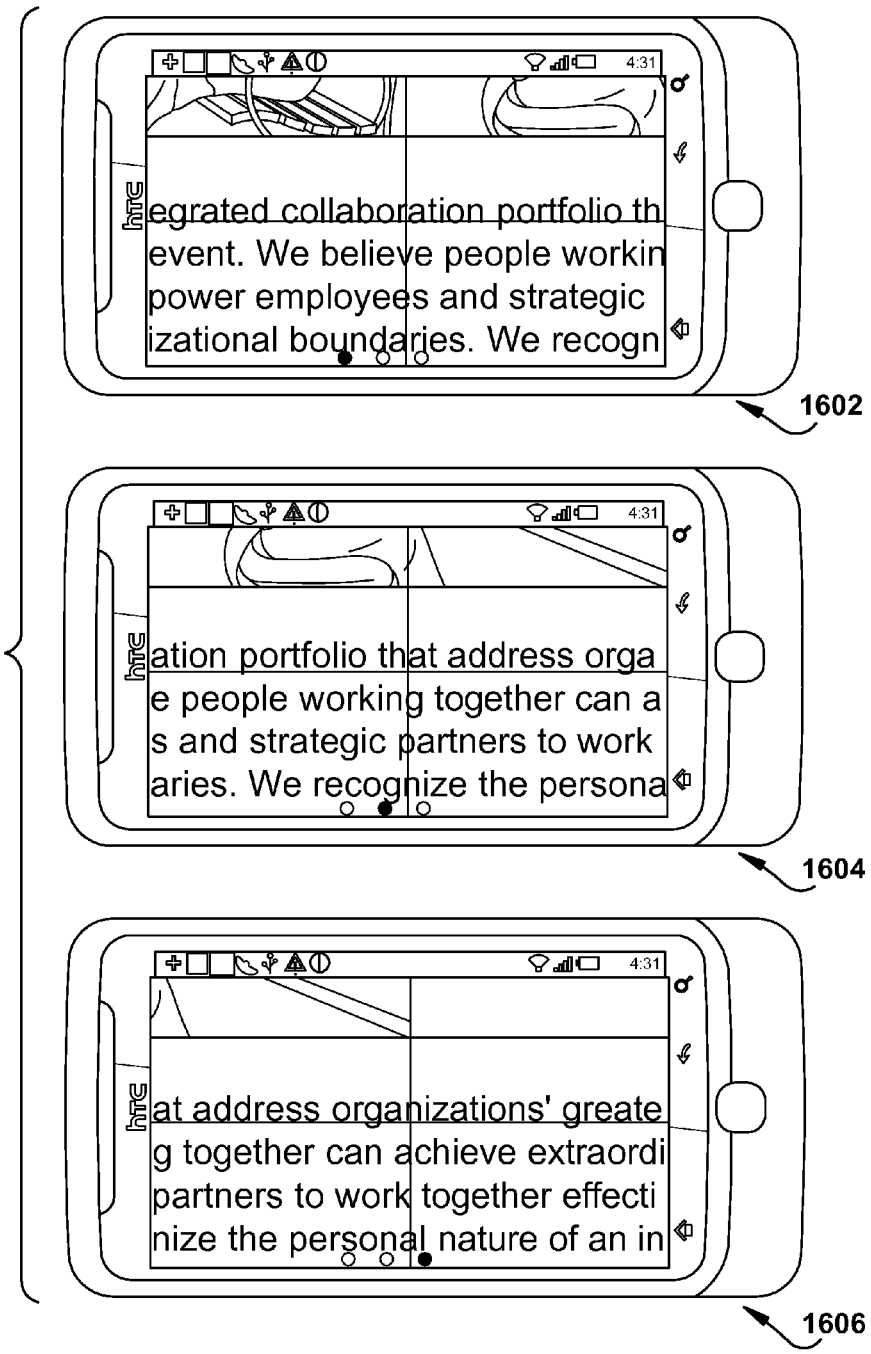
FIG. 16 illustrates an example display for a viewer device.

In an example embodiment, the shared content determination logic 1008 may suitably determine that a plurality of active windows displayed on the presenter device are candidates for sharing with the viewer devices and the shared content determination logic 1008 will suitably select the window with the highest possible match as the active window to be shared. In an example embodiment, if the viewer does not agree with the selection of such window as the best match, the viewer may suitably designate another active window as the best match for sharing with the viewer devices. A viewer may then suitably choose a desired window for viewing as is illustrated in FIG. 16 as discussed below.

In certain situations, the shared content determination logic 1008 may be unable to determine any active windows as candidates for sharing with the viewer devices. In such a situation, the shared content determination logic 1008 may suitably designate the entire content as displayed on the presenter device to be shared with the viewer devices.

Once the shared content determination logic 1008 has determined the active window or windows to be shared with each viewer device, the designated content is transmitted to at least one viewer device for display thereon as displayed at 1022. The shared content is rendered, via a rendering component, for suitable display on the at least one viewer device.

In one embodiment, the presenter device 410, via the presenter device rendering component 414, may render the shared content for at least one viewer device, for several specified viewer devices, for all of the viewer devices, or combinations thereof, and then transmit the rendered shared content accordingly. In another embodiment, the presenter device 410 may transmit at least a portion of the shared content to the server 430. The server 430, via the server rendering component 434, may render the shared content for at least one viewer device, for several specified viewer devices, for all of the viewer devices, or combinations thereof, and then transmit the rendered shared content accordingly. In another embodiment, the presenter device 410, either directly or via the server 430, may transmit the shared content to the viewer device 420. The viewer device will then suitably render the received shared content for suitable display on the viewer device. In yet another embodiment, the presenter device 410 and/or the server 430 may performing a render operation on the shared content, and then transmit the content to the at least one viewer device. The viewer device 420 may suitably perform a further rendering.

FIG. 11 is a flow chart of an example method 1100 for determining content to be shared during a collaborative computing sessions as described herein. Method 1100 may suitably be implemented on a system for content sharing in collaborative computing sessions as described herein.

At 1102, audio content is captured or received from at least a portion of the participant devices 200, such as the presenter device 410 and at least one viewer device 420, and is transmitted to the speech to text conversion component 1002.

At 1104, the speech to text conversion component 1002 converts the captured audio to text content by any suitable process, system, algorithm, or the like for interpreting and parsing speech from the participants as is known in the art and as discussed above. The text (audio) content is transmitted to the filtering logic 1004. The text (audio) content may be transmitted to the filtering logic 1004 continuously as it is converted, as a batch process, and combinations thereof.

At 1106, the filtering logic 1006 filters out or removes content that is not of high value or relevant to the current focus of the collaborative computing session. The remaining content is further analyzed to determine which of the remaining content is of higher relevance to the focus of the session. The remaining content is suitably ranked or valued accordingly by the filtering logic 1004, and the ranked content is transmitted to the shared content determination logic 1008.

Figure 12:
FIG. 12 illustrates an example of ranked converted audio to text content.

In an example embodiment, the filtering logic analyzes the remaining content to determine the value for the words, phrases, and combinations thereof contained in such content. FIG. 12 is an example of converted audio to text content which has been filtered to remove lower value content, and then analyzed to determine the value or rank of selected words and phrases.

As shown in FIG. 12, the presenter provided audio content related to certain of the shared content is displayed on the presenter device. As illustrated in FIG. 12, the presenter said "The Cisco Jabber Clients solution, part of the Cisco Unified Communications Solution." The filtering logic 1004 filtered out the lower value words, such as "the" and "of". The filtering logic 1004 then ranked the remaining eight (8) words, with the values as shown in FIG. 12. The filtering logic also ranked the value of certain phrases containing the words as further shown in FIG. 12. This data is then suitably transmitted to the shared content determination logic 1008 for further processing.

As illustrated in FIG. 12, as an example embodiment, the filtering logic 1004 determines the weight of a key word based on selected parameters, such as frequency and the sequence of the words. For example, as illustrated in FIG. 12, the word "Cisco" appears twice, so the weight of the word "Cisco" is 2. The word "Jabber" appears once, so the weight of the word "Jabber" is 1. As further illustrated in FIG. 12, the word "Jabber" immediately follows the word "Cisco", therefore the weight of "Cisco Jabber" is calculated as (2*1)*(2*2) for a weight of 8. As illustrated in FIG. 12, each of the keyword and phrases are weighted accordingly.

At 1108, in conjunction with the capture of audio content, images and/or data corresponding to (or "within") the shared content on the presenter device are captured periodically (e.g., five times per second) and transmitted to the graphic/video to text conversion component 1008.

At 1110, the graphic/video to text conversion component 1006 suitably converts the captured graphic/video content received from the presenter device to text via any suitable process, system, algorithm, or the like for as is known in the art. The text (graphic/video) content is transmitted to the shared content determination logic 1008 for further processing. The text (graphic/video) content may be transmitted to the shared content determination logic 1008 continuously as it is converted, as a batch process, and combinations thereof.

At 1112, data representative of the display capabilities or configuration of at least one viewer device is obtained by any suitable means. The data related to the display capabilities for a select viewer device may be received or determined by the presenter device, the viewer device, the server, and combinations thereof. The data is then transmitted to the shared content determination logic 1008 for further processing.

At 1114, the text (audio) content, the text (graphic/video) content, and data representative of the display capabilities of at least one viewer device are received at the shared content determination logic 1008 for use in determining the active window or relevant content to be displayed on viewer devices.

At 1116, the shared content determination logic 1008 analyzes the ranked audio to text content received from the filtering logic 1004 in conjunction with the graphic/video to text content received from the graphic/video to text conversion component 1006 to determine the active window or relevant content to be displayed on the viewer devices.

In an example embodiment, the shared content determination logic 1008 suitably divides the captured images and/or data as displayed on the presenter device into a number of cells as is needed to determine the shared content. For example, the shared content determination logic divides the captured images and/or data as displayed on the presenter device into a set number of equal sized cells, such as a grid eight (8) cells in height and eight (8) cells in width, for a total of 64 cells. An example of such a grid is illustrated in FIG. 13.

In an example embodiment, the shared content determination logic 1008 suitably analyzes each cell to determine the value or rank of the content in each cell based on the ranked audio to text content received from the filtering logic 1004 as illustrated in FIG. 12. In an example embodiment, the shared content determination logic 1008 suitably determines the rank for each cell, and then uses the rank of each cell to determine matches between the content of each cell and the ranked audio to text content. As illustrated in FIG. 13, the cells with the highest rank or the best match with the ranked audio to text content are suitably selected as candidates for the active window or the content to be shared with each viewer device.

As illustrated in FIG. 13, the shared content determination logic 1008 receives the ranked audio to text content from the filtering logic 1004 and the graphic/video to text content from the graphic/video to text conversion component 1006 and determines the best match therebetween. As illustrated in FIG. 13 as an example embodiment, the shaded rectangles illustrate that the graphic/video to text content contained therein is a match with the ranked audio to text content. Each shaded rectangle is given a value based on the match between the graphic/video to text content and the weight of the ranked audio to text content. The higher the weight of the ranked audio to text content, the higher the value of the shaded rectangle. The value of each cell is then determined based on value of each shaded rectangle contained therein. The cells with the highest values are then suitably candidates as an active window or content to be shared with a viewer device.

At 1118, the shared content determination logic 1008 suitably determines the shared content for display on a viewer device in conjunction with the received display capabilities for such viewer device. As an example, if the viewer device is a handheld portable device having a small display, the shared content will be suitably selected to efficiently use the display area for the shared content. It is understood that the shared content determination logic 1008 may suitably designate the active window or shared content for each viewer device separately, for all viewer devices, for a portion of the viewer devices, and combinations thereof.

At 1120, once the shared content determination logic 1008 has determined the content to be shared with each viewer device, the designated content is transmitted to at least one viewer device for display thereon. The shared content is rendered, via a rendering component, for suitable display on the at least one viewer device. As an example embodiment, the shared content is suitably displayed prominently in the center of the display.

Figure 14:
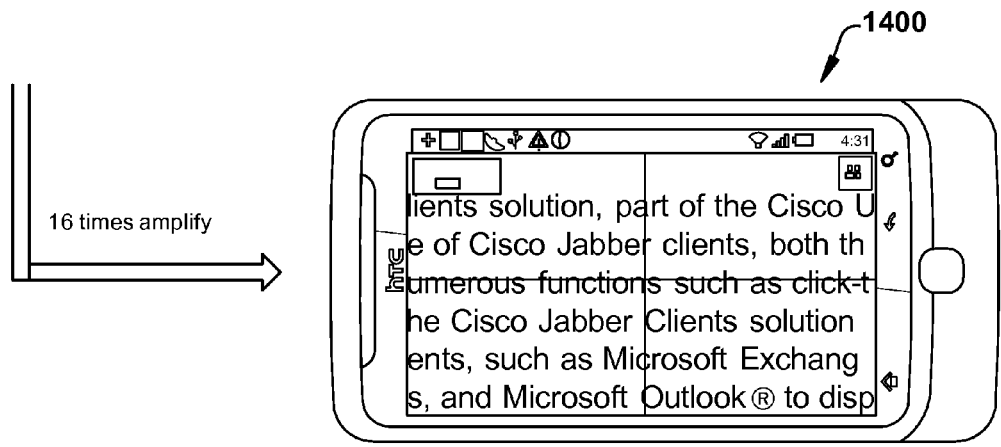
FIG. 14 illustrates an example display for a viewer device.

FIG. 14 illustrates an example display 1400 of shared content on a viewer device. The device as shown in FIG. 14 has a display area which is equal to the size of four (4) cells of the display on the presenter device as illustrated in FIG. 13. As such, the shared content as determined by the shared content determination logic 1008 as the best match is amplified sixteen (16) times when displayed on the viewer device in order to maximize the display of the shared content to the viewer.

Figure 15:
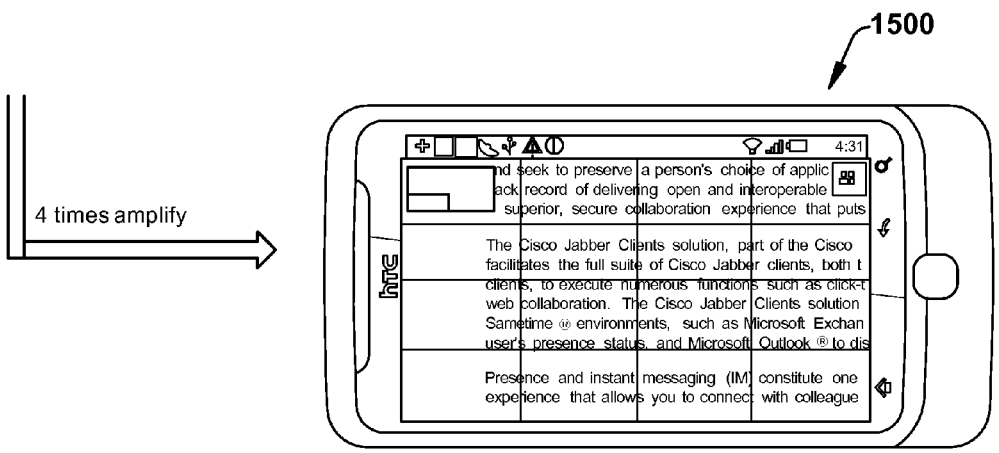
FIG. 15 illustrates an example display for a viewer device.

FIG. 15 illustrates an example display 1500 of shared content on a viewer device. The device as shown in FIG. 15 has a display area which is equal to the size of sixteen (16) cells of the display on the presenter device as illustrated in FIG. 13. As such, the shared content as determined by the shared content determination logic 1008 as the best match is amplified four (4) times when displayed on the viewer device in order to maximize the display of the shared content to the viewer.

FIG. 16 illustrates an example of a plurality of cells which may be a match or active window to be displayed on a viewer device as illustrated as 1602, 1604, and 1606. In an example embodiment, a viewer may suitably select the cell or cells to display on the device as is known in the art. In another embodiment, the viewer device may suitably select the cell or cells to display thereon. In another embodiment, the presenter device and/or the server may assist in the determination of the cell or cells to be displayed on the viewer device.

At 1122, a determination is made whether the collaborative computing session has terminated. If the session has not terminated, then the flow proceeds to back to 1102 to continue to capture audio content, back to 1108 to continue to capture graphic/video content, and back to 1112 to continue to obtain viewer device capabilities for subsequent determinations of shared content during the session. If the session has terminated, then the process ends at 1124.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
    maintaining a collaborative computing session between a plurality of participant devices in data communication with each other, wherein at least one participant device operates as a presenter device to share data associated with the group consisting of at least one application program executing on the presenter device, a predefined area of a display of the presenter device, and combinations thereof, with at least one other participant viewer device, wherein one or more of the presenter device or at least one viewer device is operable to generate an audio stream;
    designating data associated with the group consisting of at least one application program executing on the presenter device, a predefined area of the display of the presenter device, and combinations thereof, as shared data, of which at least a portion, is to be shared with at least one viewer device during the collaborative computing session;
    identifying at least one active region within the shared data, wherein the active region is determined as a function of content of at least one associated audio stream generated by one or more of the presenter device or at least one viewer device in correlation with content of the shared data;
    transmitting the designated shared data to the at least one viewer device;
    rendering the shared data for display on the at least one viewer device, such that the shared data will be displayed to maximize the display of the at least one active region; and
    displaying the rendered shared data on the at least one viewer device.

2. The method of claim 1, wherein identifying at least one active region further comprises:
    converting speech from at least one associated audio stream generated by one or more of the presenter device or at least one viewer device to text; and
    analyzing converted speech to text content in correlation with content of shared data to determine at least one active region within the shared data.

3. The method of claim 2, wherein identifying at least one active region further comprises:
    analyzing the converted speech to text content to identify content contained therein of lower value than other content contained therein; and
    filtering the converted speech to text content to remove content identified as of lower value to generate filtered content.

4. The method of claim 3, wherein identifying at least one active region further comprises:
    analyzing the filtered content to identify at least one sub-content unit contained therein, wherein a sub-content unit is comprised of the group consisting of a word, a plurality of words, phrases, and combinations thereof;
    determining a ranking value for the at least one sub-content unit; and
    generating data representative of the ranking value for each ranked sub-content unit.

5. The method of claim 4, wherein identifying an active region further comprises:
    capturing image data representative of shared data as displayed on the presenter device; and
    converting the captured image data to text content.

6. The method of claim 5, wherein converting the captured image data to text content is performed by optical character recognition.

7. The method of claim 6, wherein identifying an active region further comprises:
    dividing the converted image data to text content into a specified number of cells;

analyzing the content of each of the cells, wherein the analyzing the content for a cell comprises determining if the content contained in the cell includes at least one ranked sub-content unit;

determining a ranking value for each of the cells which include at least one ranked sub-content unit; and generating data representative of a ranking value for each ranked cell.

8. The method of claim 7, wherein identifying an active region further comprises:

identifying at least one ranked cell as a candidate for an active region based on the ranking value of the at least one ranked cell; and designating at least one candidate as an active region to be displayed on at least one viewer device.

9. The method of claim 8, wherein identifying an active region further comprises:

receiving data representative of display capabilities for at least one viewer device; and designating at least one candidate as an active region to be displayed on at least one viewer device is in accordance with received display capabilities for the at least one viewer device.

10. The method of claim 9, wherein rendering the shared data on the at least one viewer device further comprises rendering the shared data such that the shared data will be displayed to maximize the at least one active region while minimizing the display of the shared data not containing an active region.

11. An apparatus, comprising:

at least one network interface configured to transmit and receive data on a computer network;

a plurality of participant devices in data communication with each other via the network, wherein at least one of the participant devices is operable to generate an audio stream;

a processor coupled to the at least one network interface and configured to execute one or more processes; and a memory configured to store a collaboration process executable by the processor, the collaboration process when executed operable to:

maintain a collaborative computing session between the plurality of participant devices in data communication with each other, wherein at least one participant device operates as a presenter device to share data associated with the group consisting of at least one application program executing on the presenter device, a predefined area of a display of the presenter device, and combinations thereof, with at least one other participant viewer device;

designate data associated with the group consisting of at least one application program executing on the presenter device, a predefined area of the display of the presenter device, and combinations thereof, as shared data, of which at least a portion is to be shared with at least one viewer device during the collaborative computing session;

identify at least one active region within the shared data, wherein the active region is determined as a function of content of at least one associated audio stream generated by one or more of the presenter device or at least one viewer device in correlation with content of the shared data;

transmit the designated shared data to the at least one viewer device;

render the shared data for display on the at least one viewer device, such that the shared data will be displayed to maximize the display of the at least one active region; and display the rendered shared data on the at least one viewer device.

12. The apparatus of claim 11, wherein the processor is further operable to:

convert speech from at least one associated audio stream generated by one or more of the presenter device or at least one viewer device to text; and analyze converted speech to text content in correlation with content of shared data to determine at least one active region within the shared data.

13. The apparatus of claim 12, wherein the processor is further operable to:

analyze the converted speech to text content to identify content contained therein of lower value than other content contained therein; and filter the converted speech to text content to remove content identified as of lower value to generate filtered content.

14. The apparatus of claim 13, wherein the processor is further operable to:

analyze the filtered content to identify at least one sub-content unit contained therein, wherein a sub-content unit is comprised of the group consisting of a word, a plurality of words, phrases, and combinations thereof;

determine a ranking value for the at least one sub-content unit; and generate data representative of the ranking value for each ranked sub-content unit.

15. The apparatus of claim 14, wherein the processor is further operable to:

capture image data representative of shared data as displayed on the presenter device; and convert the captured image data to text content.

16. The apparatus of claim 15, wherein the processor is further operable to:

divide the converted image data to text content into a specified number of cells;

analyze the content of each of the cells, wherein the analyzing the content for a cells comprises determining if the content contained in the cell includes at least one ranked sub-content unit;

determine a ranking value for each of the cells which include at least one ranked sub-content unit; and generate data representative of a ranking value for each ranked cell.

17. The apparatus of claim 16, wherein the processor is further operable to:

identify at least one ranked cell as a candidate for an active region based on the ranking value of the at least one ranked cell; and designate at least one candidate as an active region to be displayed on at least one viewer device.

18. The apparatus of claim 17, wherein the processor is further operable to:

receive data representative of display capabilities for at least one viewer device; and designate at least one candidate as an active region to be displayed on at least one viewer device is in accordance with received display capabilities for the at least one viewer device.

19. The apparatus of claim 18, wherein the processor is further operable to display the shared data such that the shared data will be displayed to maximize the at least one active region while minimizing the display of the shared data not containing an active region.

20. Logic encoded in at least one non-transitory computer readable media for execution by a processor, and when executed by the processor operable to:
    maintain a collaborative computing session between a plurality of participant devices in data communication with each other, wherein at least one participant device operates as a presenter device to share data associated with the group consisting of at least one application program executing on the presenter device, a predefined area of a display of the presenter device, and combinations thereof, with at least one other participant viewer device, wherein one or more of the presenter device or at least one viewer device is operable to generate an audio stream;
    designate data associated with the group consisting of at least one application program executing on the presenter device, a predefined area of the display of the presenter device, and combinations thereof, as shared data, of which at least a portion is to be shared with at least one viewer device during the collaborative computing session;
    identify at least one active region within the shared data, wherein the active region is determined as a function of content of at least one associated audio stream generated by one or more of the presenter device or at least one viewer device in correlation with content of the shared data;
    transmit the designated shared data to the at least one viewer device;
    render the shared data for display on the at least one viewer device, such that the shared data will be displayed to maximize the display of the at least one active region; and
    display the rendered shared data on the at least one viewer device.

* * * * *